United States Patent
Mashimo

(10) Patent No.: US 11,652,969 B2
(45) Date of Patent: May 16, 2023

(54) PROJECTION APPARATUS AND OPERATION DETECTION APPARATUS

(71) Applicant: Jun Mashimo, Kanagawa (JP)

(72) Inventor: Jun Mashimo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 209 days.

(21) Appl. No.: 17/169,734

(22) Filed: Feb. 8, 2021

(65) Prior Publication Data

US 2021/0250563 A1    Aug. 12, 2021

(30) Foreign Application Priority Data

Feb. 10, 2020   (JP) .............................. JP2020-020965
Dec. 21, 2020   (JP) .............................. JP2020-211673

(51) Int. Cl.
*H04N 9/31*      (2006.01)
*G03B 21/00*     (2006.01)
*G03B 21/14*     (2006.01)

(52) U.S. Cl.
CPC ........... *H04N 9/3194* (2013.01); *G03B 21/00* (2013.01); *G03B 21/14* (2013.01); *G03B 21/142* (2013.01); *H04N 9/3152* (2013.01)

(58) Field of Classification Search
CPC .. H04N 9/3141; H04N 9/3152; H04N 9/3176; H04N 9/3194; G03B 21/00; G03B 21/14; G03B 21/142; G03B 21/145; G03B 21/147
See application file for complete search history.

(56) References Cited

U.S. PATENT DOCUMENTS

| | | | |
|---|---|---|---|
| 8,167,441 B2 * | 5/2012 | Ichieda | ................ H04N 9/3105 353/121 |
| 8,529,069 B2 * | 9/2013 | Oka | ..................... H04N 9/3194 353/30 |
| 9,400,562 B2 | 7/2016 | Takazawa | |
| 9,541,818 B2 | 1/2017 | Mikawa et al. | |
| 9,632,616 B2 | 4/2017 | Kobayashi et al. | |
| 9,713,282 B2 | 7/2017 | Mikawa et al. | |
| 9,778,551 B2 | 10/2017 | Tsuchiya et al. | |
| 9,785,244 B2 | 10/2017 | Sato et al. | |
| 9,829,671 B2 | 11/2017 | Tsuchiya et al. | |
| 9,864,262 B2 | 1/2018 | Fujioka et al. | |
| 9,964,733 B2 | 5/2018 | Fujioka et al. | |
| 10,277,871 B2 | 4/2019 | Mikawa et al. | |

(Continued)

FOREIGN PATENT DOCUMENTS

| | | |
|---|---|---|
| JP | 2013-122491 | 6/2013 |
| JP | 2014-059695 | 4/2014 |

(Continued)

*Primary Examiner* — Sultan Chowdhury
(74) *Attorney, Agent, or Firm* — IPUSA, PLLC

(57) ABSTRACT

A projection apparatus includes a main body configured to project and display an image from a projection port of the main body; and an operation detection apparatus detachably attached to the main body and configured to acquire operation information relating to an operation on a projection screen performed by an operator. The main body includes an attachment portion provided on a surface of the main body on which the projection port is provided. The attachment portion is a portion where the operation detection apparatus attached to the main body.

8 Claims, 34 Drawing Sheets

(56) References Cited

U.S. PATENT DOCUMENTS

| | | | |
|---|---|---|---|
| 2008/0036897 A1* | 2/2008 | Abe | G02B 27/022 |
| | | | 348/335 |
| 2011/0075102 A1* | 3/2011 | Nozaki | H04N 5/23296 |
| | | | 353/30 |
| 2017/0068150 A1 | 3/2017 | Nishimori et al. | |
| 2017/0068151 A1 | 3/2017 | Mikawa et al. | |
| 2017/0068152 A1 | 3/2017 | Mikawa et al. | |
| 2017/0339382 A1* | 11/2017 | Furui | H04N 5/247 |
| 2018/0063496 A1* | 3/2018 | Kasuga | H04N 9/3194 |
| 2018/0120678 A1 | 5/2018 | Mikutsu et al. | |
| 2018/0156401 A1* | 6/2018 | Ono | F21V 19/001 |

FOREIGN PATENT DOCUMENTS

| | | |
|---|---|---|
| JP | 2014-138257 | 7/2014 |
| JP | 2014-197380 | 10/2014 |
| JP | 2015-041233 | 3/2015 |
| JP | 2016-009003 | 1/2016 |
| JP | 2016-046471 | 4/2016 |
| JP | 2019-133092 | 8/2019 |

* cited by examiner

US 11,652,969 B2

PROJECTION APPARATUS AND OPERATION DETECTION APPARATUS

CROSS-REFERENCE TO RELATED APPLICATION

The present application is based on and claims priority under 35 U.S.C. § 119 to Japanese Patent Application No. 2020-020965, filed on Feb. 10, 2020 and Japanese Patent Application No. 2020-211673, filed on Dec. 21, 2020, the contents of which are incorporated herein by reference in their entirety.

BACKGROUND OF THE INVENTION

1. Field of the Invention

The present invention relates to a projection apparatus and an operation detection apparatus disposed in the projection apparatus.

2. Description of the Related Art

A projection apparatus including a sensor for detecting the operation of a user and the like on a projection surface, and having an interactive function such as modifying a projection image based on the detection result, is known.

For example, in Patent Document 1, an imaging unit that captures a range including an image projected onto a projection surface, is described as the above sensor. It is also described that the imaging unit is disposed in the vicinity of a projection lens.

Patent Document 1: Japanese Unexamined Patent Application Publication No. 2014-59695

SUMMARY OF THE INVENTION

According to one aspect of the present invention, there is provided a projection apparatus including a main body configured to project and display an image from a projection port of the main body; and an operation detection apparatus detachably attached to the main body and configured to acquire operation information relating to an operation on a projection screen performed by an operator, wherein the main body includes an attachment portion provided on a surface of the main body on which the projection port is provided, the attachment portion being a portion where the operation detection apparatus attached to the main body.

DETAILED DESCRIPTION OF THE PREFERRED EMBODIMENTS

Figure 1:
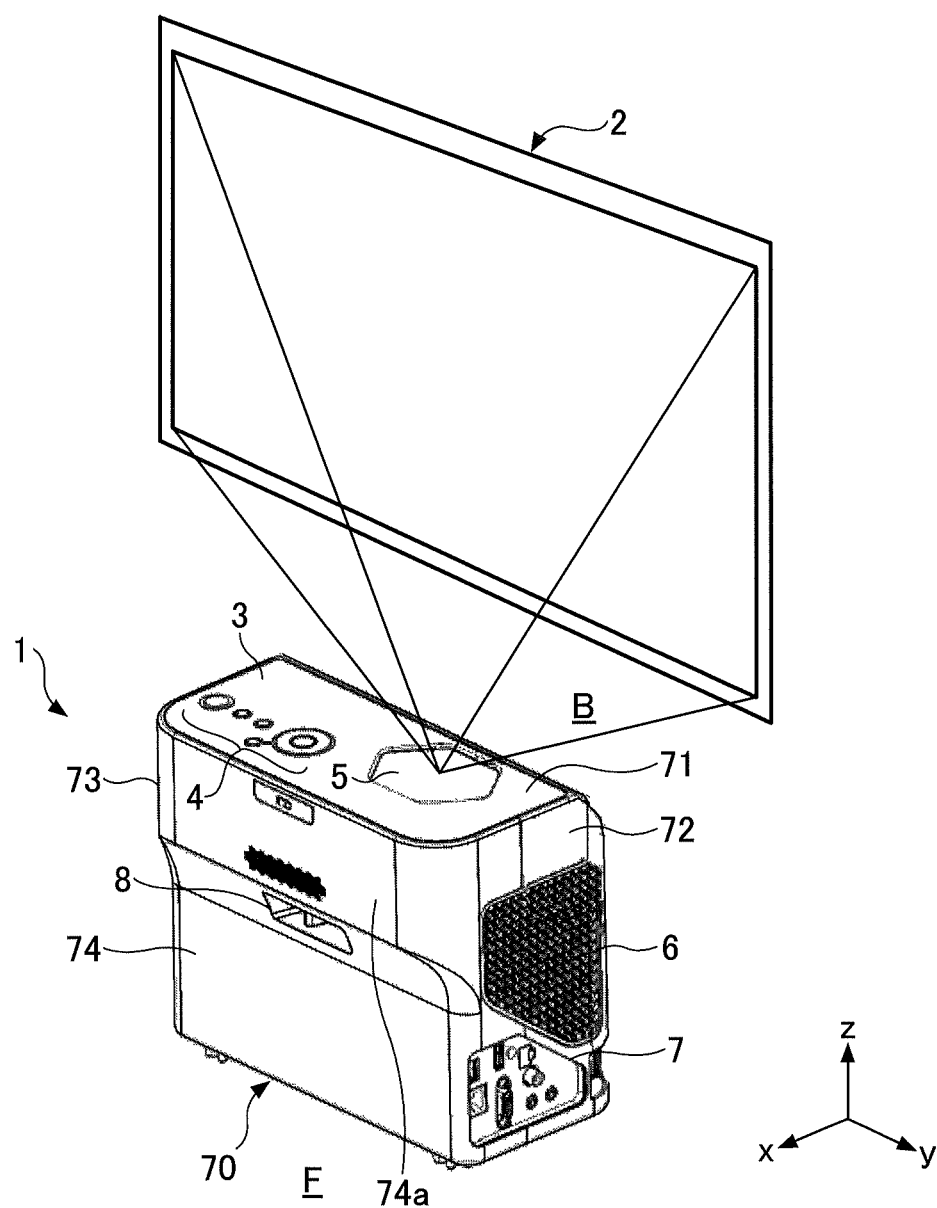
FIG. 1 is a perspective view of a mode of use of a projection apparatus according to an embodiment of the present invention.

In the conventional configuration described in Patent Document 1, depending on the mounting position where the imaging unit is disposed, the projection apparatus may become larger or the arrangement of optical components may be affected.

A problem to be addressed by an embodiment of the present invention is to provide a compact projection apparatus having an interactive function.

Hereinafter, embodiments will be described with reference to the accompanying drawings. In order to facilitate the understanding of the description, the same elements in the respective drawings are, as far as possible, denoted by the same reference numerals, and overlapping descriptions are omitted.

In the following description, the x direction, the y direction, and the z direction are perpendicular to each other. The x direction and the y direction are horizontal directions and the z direction is a vertical direction. The x direction is the direction in which the front side F and the back side B of a main body unit 70 of a projection apparatus 1 face each other, and the front side F is in the positive direction and the back side B is in the negative direction. As a matter of convenience, the z positive direction side may be referred to as the upper side, and the z negative direction side may be referred to as the lower side.

<Schematic Configuration of the Main Body Unit of the Projection Apparatus>

First, a schematic configuration of the main body unit 70 of the projection apparatus 1 according town embodiment will be described with reference to FIGS. 1 to 10. The configuration that includes an interactive module 80 (operation detection apparatus) as an essential part of the embodiment will be described below with reference to FIG. 11 and thereafter.

Figure 2:
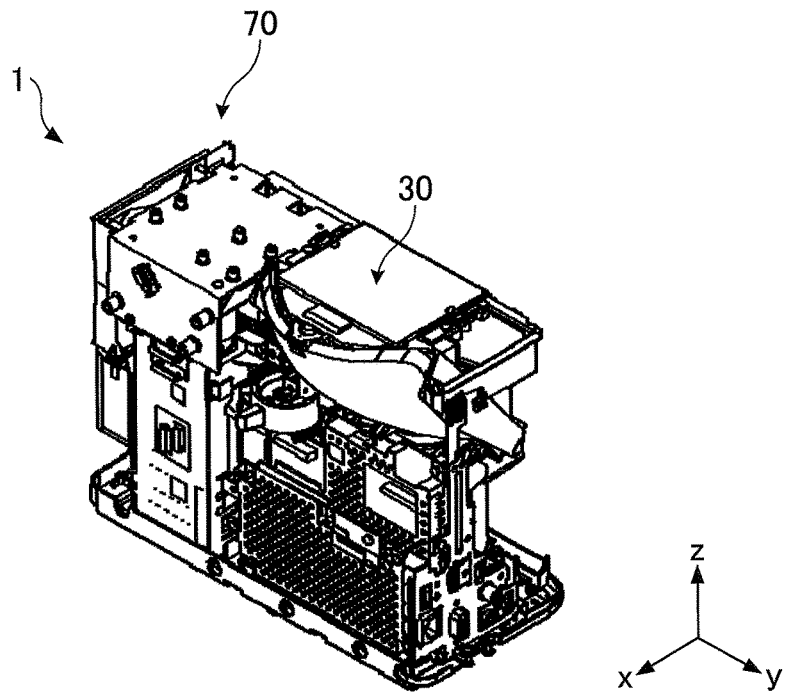
FIG. 2 is a perspective view of the internal structure of the projection apparatus viewed from the front side of FIG. 1 according to an embodiment of the present invention.
Figure 3:
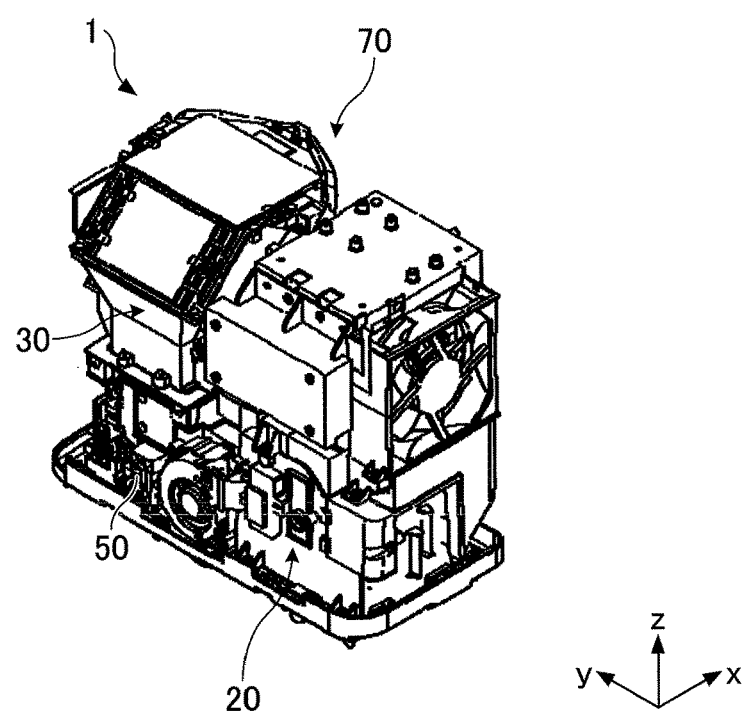
FIG. 3 is a perspective view of the internal structure of the projection apparatus viewed from the back side of FIG. 1 according to an embodiment of the present invention.

FIGS. 1 to 3 illustrate an example of the schematic configuration of the main body unit 70 of the projection apparatus 1 according to an embodiment. FIG. 1 is a perspective view illustrating a schematic configuration of the main body unit 70 of the projection apparatus 1 during projection. FIG. 2 and FIG. 3 are internal configuration diagrams illustrating a state in which an outer cover 3 of the main body unit 70 of the projection apparatus 1 is removed. FIG. 2 is a perspective view viewed from the front side F of FIG. 1, and FIG. 3 is a perspective view viewed from the back side B of FIG. 1.

The projection apparatus 1 is an apparatus that generates an image based on image data input from a personal computer, a video camera, and the like, and displays the image by projecting the image on a projection surface such as a screen 2. The illustrated projection apparatus 1 is a compact, lightweight front type projector using a Digital Micro-mirror Device (DMD). Also, the projection apparatus 1 is a vertical type but the present embodiment is not limited as such.

The main body unit 70 of the projection apparatus 1 has an internal structure mounted in the outer cover 3. An upper surface 71 of the outer cover 3 is provided with an operation unit 4 (operation part) and a projection port 5. A right side surface 72 on the y positive direction side is provided with an intake port 6 and a connector unit 7. A left side surface 73 on the y negative direction side is provided with an exhaust port 9 (see FIG. 17). A front surface 74 of the front side F is provided with a focus adjusting unit 8.

In the following description, the front side of the main body unit 70 of the projection apparatus 1 in FIG. 1 is expressed as the "front side F", and the back side of the main body unit 70 in FIG. 1 is expressed as the "back side B". The screen 2 and the like is installed facing the back side B and an image to be displayed is projected from the projection port 5 to the screen 2 facing the back side B. The operation unit 4 is arranged so as to be operated by an operator from the front side F (an operation instruction for performing a projection operation is input to the operation unit 4 (the operation part)). For example, the operation unit 4 is arranged so that the characters described on the operation unit 4 are vertically oriented in the correct direction when viewed from the front side F, so that the operator can easily operate the operation unit 4 from the front side F.

As illustrated in FIGS. 2 and 3, the projection apparatus 1 includes a light source device 20, an optical engine 30, and a cooling device 50 as the basic configuration. Further, structures that are typically mounted in a projector may be similarly mounted in the projection apparatus 1, and the details will not be described here.

Figure 4:
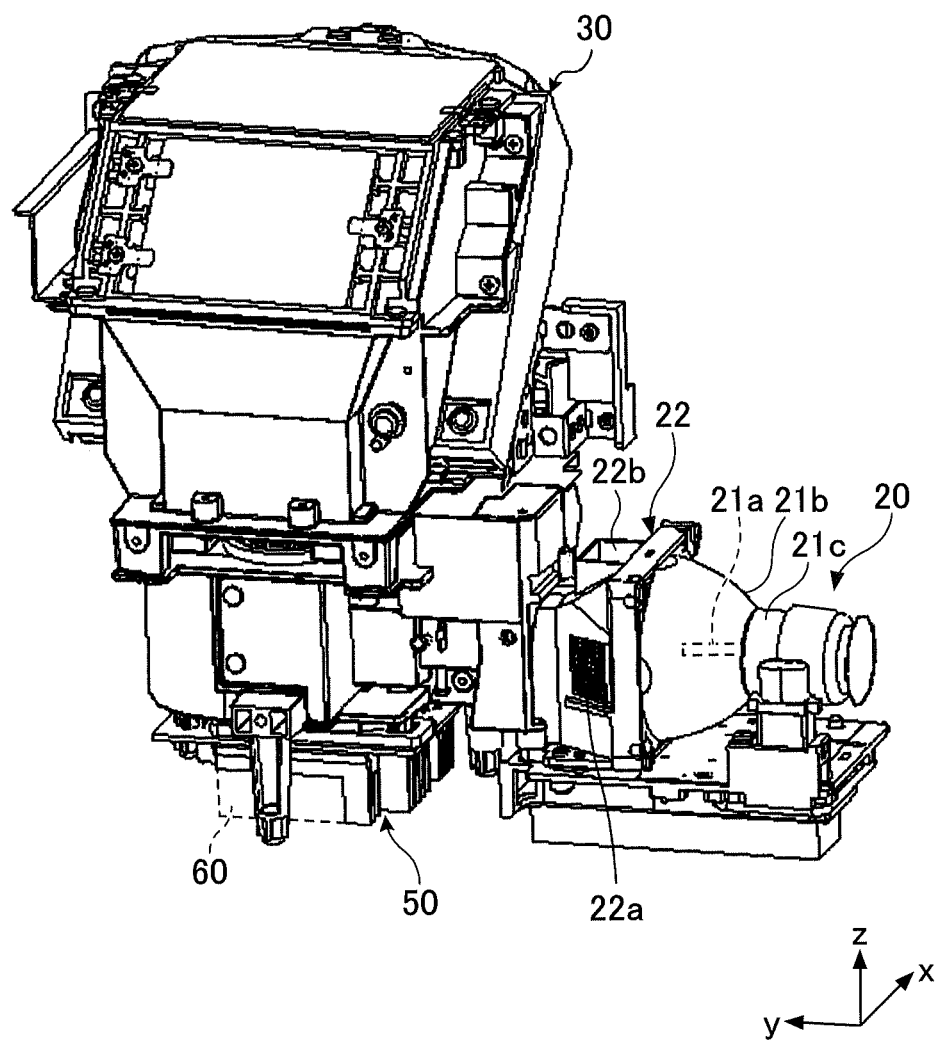
FIG. 4 is a perspective view illustrating the relationship between an optical engine and a light source device according to an embodiment of the present invention.
Figure 5:
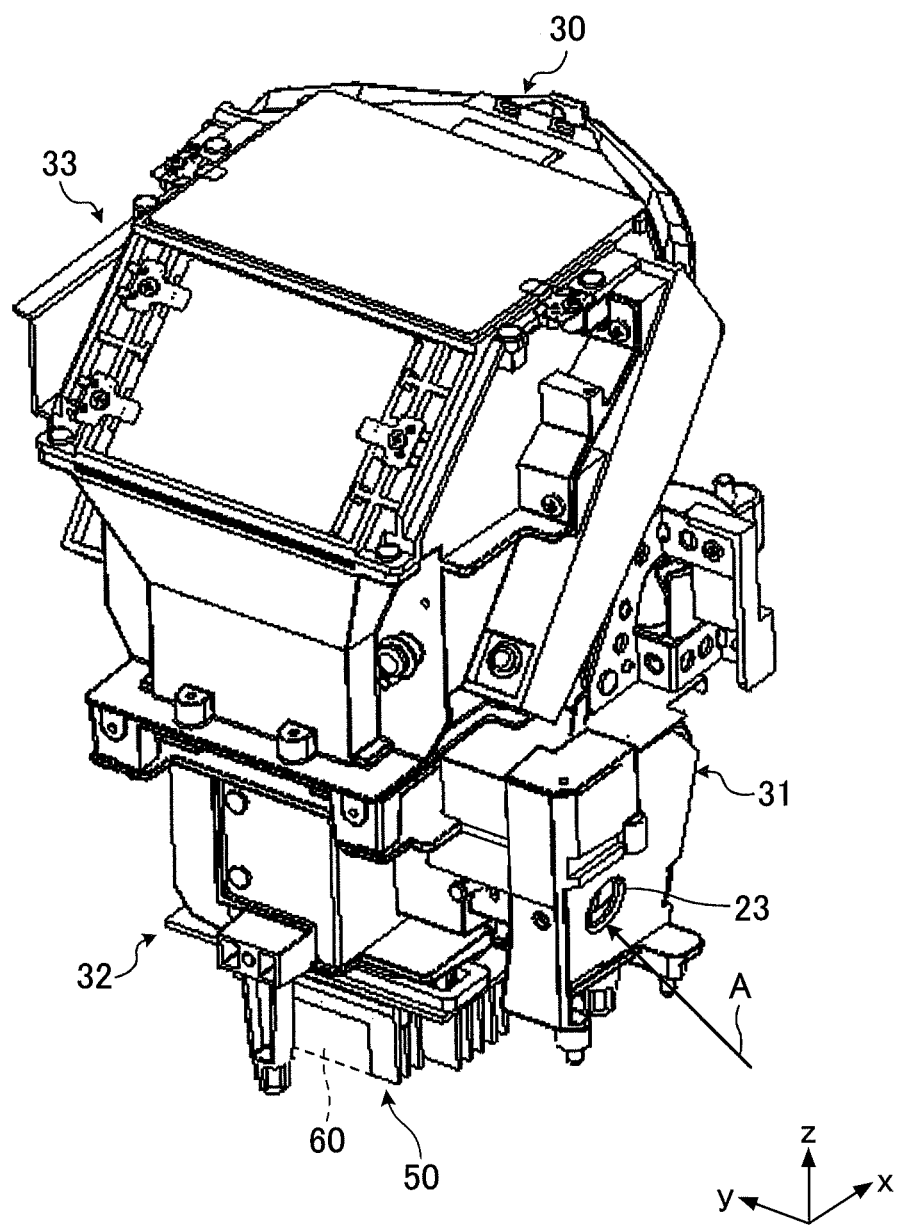
FIG. 5 is a perspective view of a schematic configuration of an optical engine according to an embodiment of the present invention.

Next, the light source device 20, the optical engine 30, and the cooling device 50 will be described with reference to the drawings. FIG. 4 illustrates a state in which the light source device 20, the optical engine 30, and the cooling device 50 are taken out from the projection apparatus 1. FIG. 5 illustrates a state in which only the optical engine 30 and the cooling device 50 are taken out from the projection apparatus 1.

The cooling device 50 is configured by being combined with a sirocco fan 60 (corresponding to a blower unit) illustrated by a dashed line.

The light source device 20 controls a light source, such as a high-pressure mercury lamp, to supply the optical engine 30 with the necessary light (white light) for projecting an image.

The light source device 20 includes a light source 21a, such as a halogen lamp, a metal halide lamp, and a high-pressure mercury lamp, a reflector 21b, and a seal portion 21c.

In the light source device 20, a light source housing 22 that holds an upper end portion of the reflector 21b at the light output side of the light source 21a, is screwed to the light source device 20. As illustrated in FIG. 5, a light emitting window 23 is provided on the side of the light source housing 22 opposite the side where the light source 21a is disposed. The light emitted from the light source 21a is collected at the light emitting window 23 by the reflector 21b held in the light source housing 22, and is emitted through the light emitting window 23.

On the side surface of the light source housing 22, a light source intake port 22a is provided, into which air for cooling the light source 21a flows, and a light source exhaust port 22b through which the air heated by the heat of the light source 21a is exhausted.

The optical engine 30 performs control for processing input image data and projecting an image, using light supplied from the light source device 20. As illustrated in FIG. 5, the optical engine 30 includes an illumination optical unit 31, a projection optical unit 33, and an image processing unit 32. White light from the light source device 20 described above is first irradiated to the illumination optical unit 31. The illumination optical unit 31 disperses the white light from the light source device 20 to the respective components of red, green, and blue (RGB), and guides the light to the image processing unit 32. The image processing unit 32 forms an image according to a modulation signal and generates an image to be projected, from the input image data. The projection optical unit 33 projects and enlarges an image generated by the image processing unit 32 on an irradiation surface.

Figure 6:
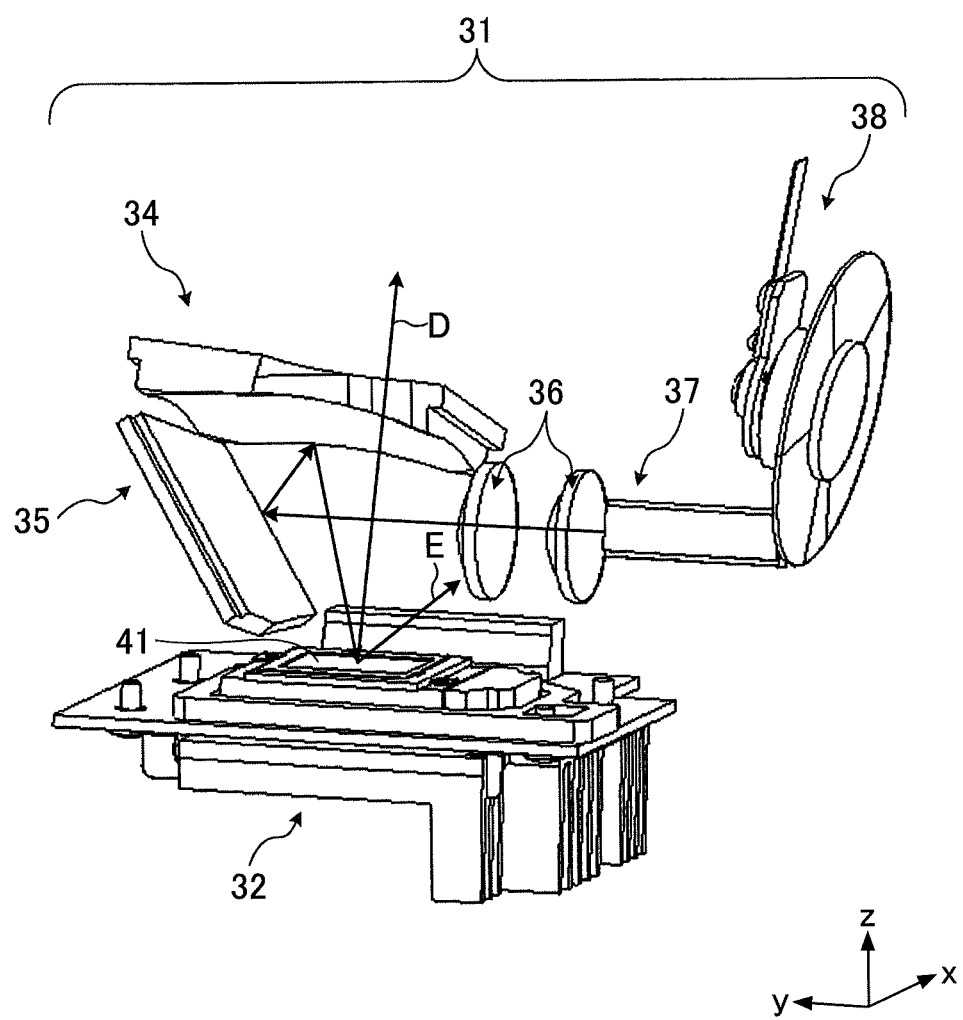
FIG. 6 illustrates a schematic configuration of an illumination optical unit and an image processing unit and the light path according to an embodiment of the present invention.

FIG. 6 is a diagram illustrating the arrangement configuration and the light path of the illumination optical unit 31 and the image processing unit 32.

The illumination optical unit 31 includes a color wheel 38, a light tunnel 37, a relay lens 36, a cylinder mirror 35, and a concave mirror 34. The color wheel 38 converts the white light emitted from the light source device 20 into light in which each color of RGB is repeated at every time unit by a disc-shaped color filter, and emits the light.

The light tunnel 37 having a cylindrical shape is formed by bonding glass sheets together, to guide the light emitted from the color wheel 38. The relay lens 36 is formed by combining two lenses and collects light emitted from the light tunnel 37 while correcting the on-axis chromatic aberration of the light.

The cylinder mirror 35 and the concave mirror 34 respectively reflect the light emitted from the relay lens 36. The reflected light enters the image processing unit 32, and the image processing unit 32 has a generally rectangular mirror surface formed of a plurality of micro mirrors. The image processing unit 32 includes a Digital Micromirror Device (DMD) element 41 that processes and reflects the projection light to form a predetermined image, as the respective micro mirrors are driven in a time-division manner based on data of a video or an image. In the image processing unit 32, the light used by the plurality of micromirrors is reflected towards a projection lens 51 (see FIG. 8, etc.) in a direction represented by an arrow D in the drawing based on the image data time-divided by the DMD element 41 (a first cooling target), and the light to be discarded is reflected towards an OFF light plate 53 (see FIG. 8, etc.) in a direction represented by an arrow E.

Figure 7:
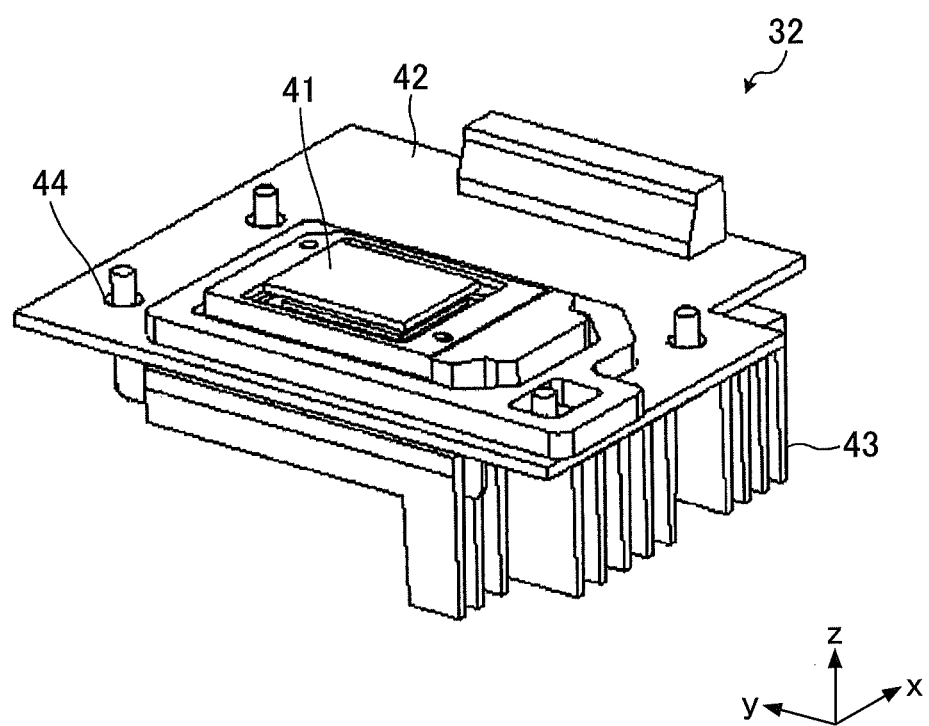
FIG. 7 is a perspective view illustrating a schematic configuration of an image processing unit according to an embodiment of the present invention.

FIG. 7 is a perspective view illustrating the structure of the image processing unit 32. The image processing unit 32 includes the DMD element 41, a DMD printed circuit board 42 for controlling the DMD element 41, a heat sink 43 for cooling the DMD element 41, and a fixing plate 44 for pressing the heat sink 43 against the DMD element 41. In the present embodiment, the heat sink 43 corresponds to a heat dissipator. The heat sink 43 contacts the DMD element 41 that is the first cooling target, thereby dissipating heat from the DMD element 41.

Figure 8:
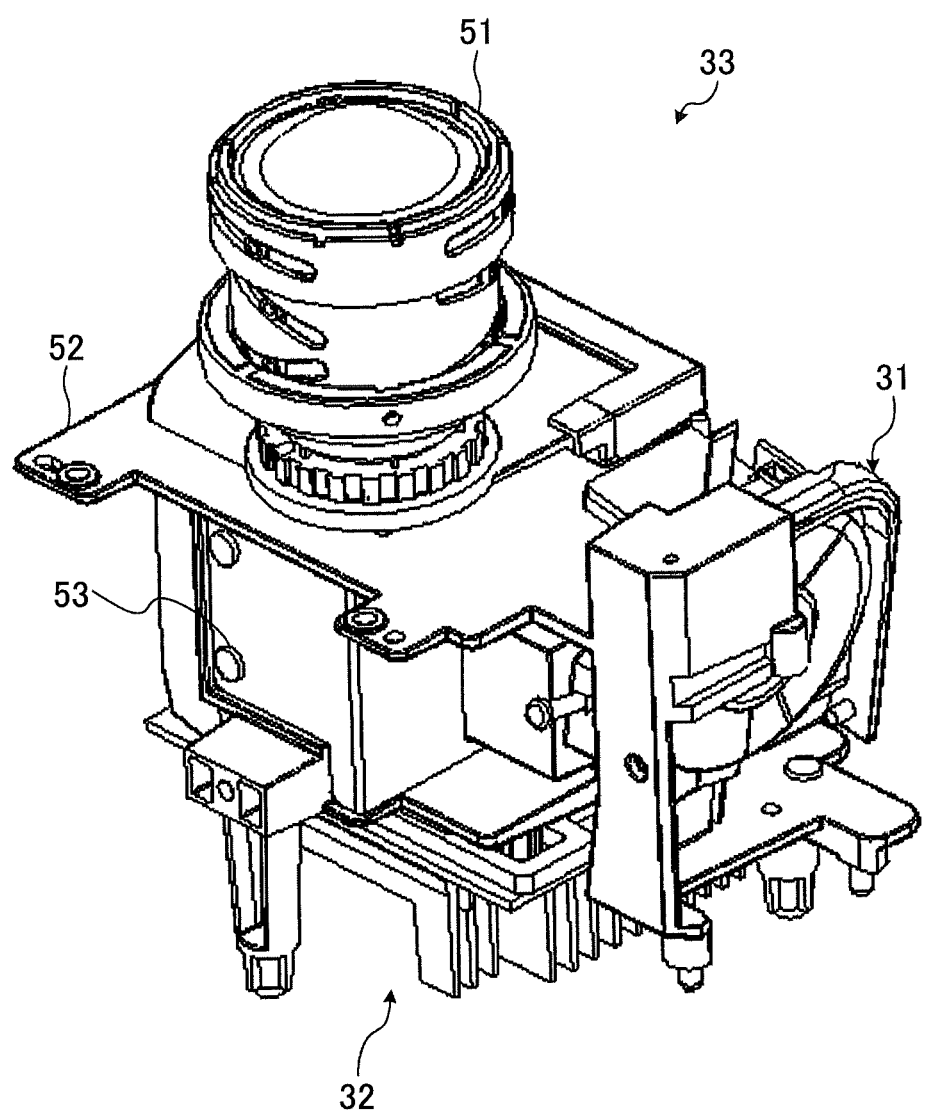
FIG. 8 is a perspective view of a portion of a configuration of a projection optical unit according to an embodiment of the present invention.
Figure 9:
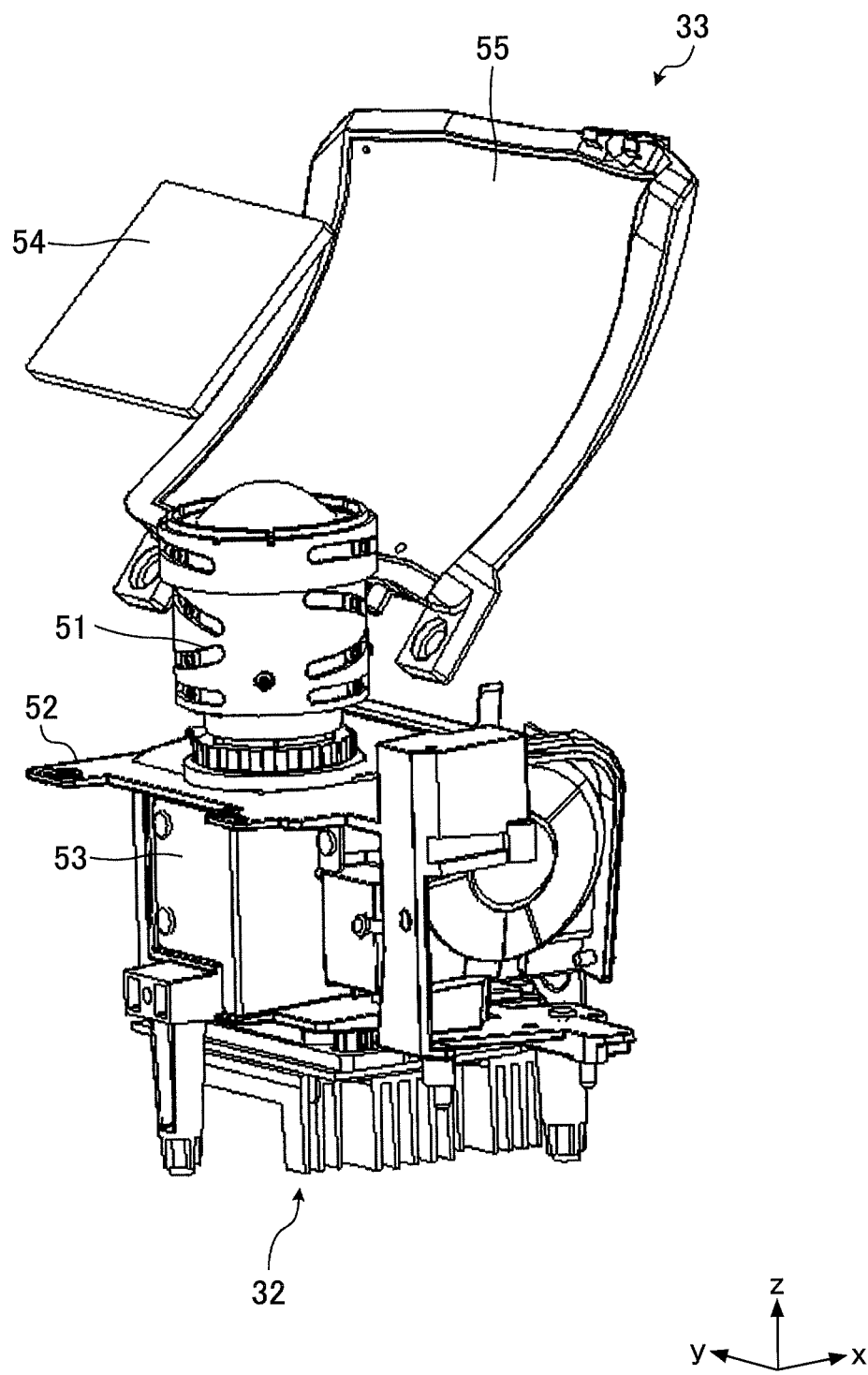
FIG. 9 is a perspective view illustrating the configuration of the projection optical unit according to an embodiment of the present invention.

FIGS. 8 and 9 are perspective views illustrating the configuration of the projection optical unit 33. The light that passes through the image processing unit 32 is reflected to the projection lens 51 of FIG. 8, and the light that is discarded is reflected to the OFF light plate 53.

Figure 10:
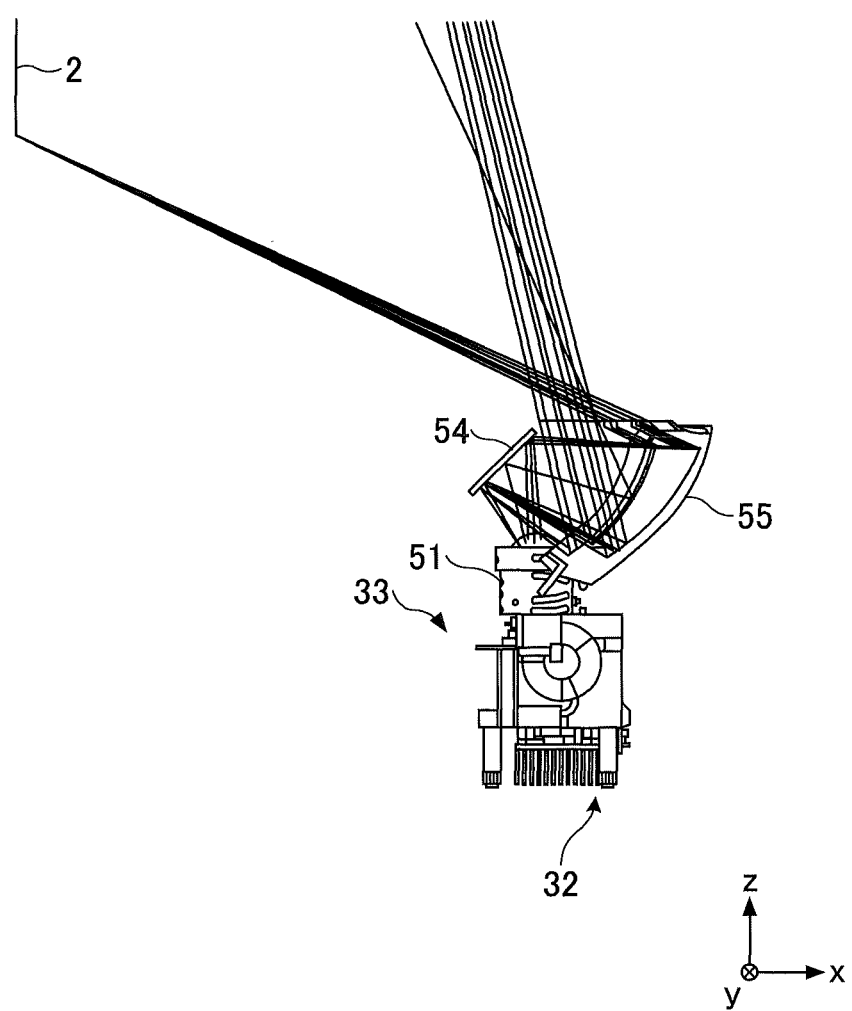
FIG. 10 is an explanatory view for explaining the light path of a projection optical unit according to an embodiment of the present invention.

FIG. 10 is a side view illustrating the light path of the projection optical unit 33. After the light passes through the projection lens 51, the light path of the enlarged image light is turned back by a turning back mirror 54 and is enlarged and projected onto the screen 2 by a free curved mirror 55. By the above-described configuration, in the projection apparatus 1, the optical engine 30 can be disposed close to the screen 2 and the projection optical unit 33 can be a vertical type in which the optical axis path is in a perpendicular direction, thereby reducing the installation area.

<Overall Configuration of Projection Apparatus>

Next, the overall configuration of the projection apparatus 1 according to the embodiment will be described with reference to FIGS. 11 to 18.

Figure 11:
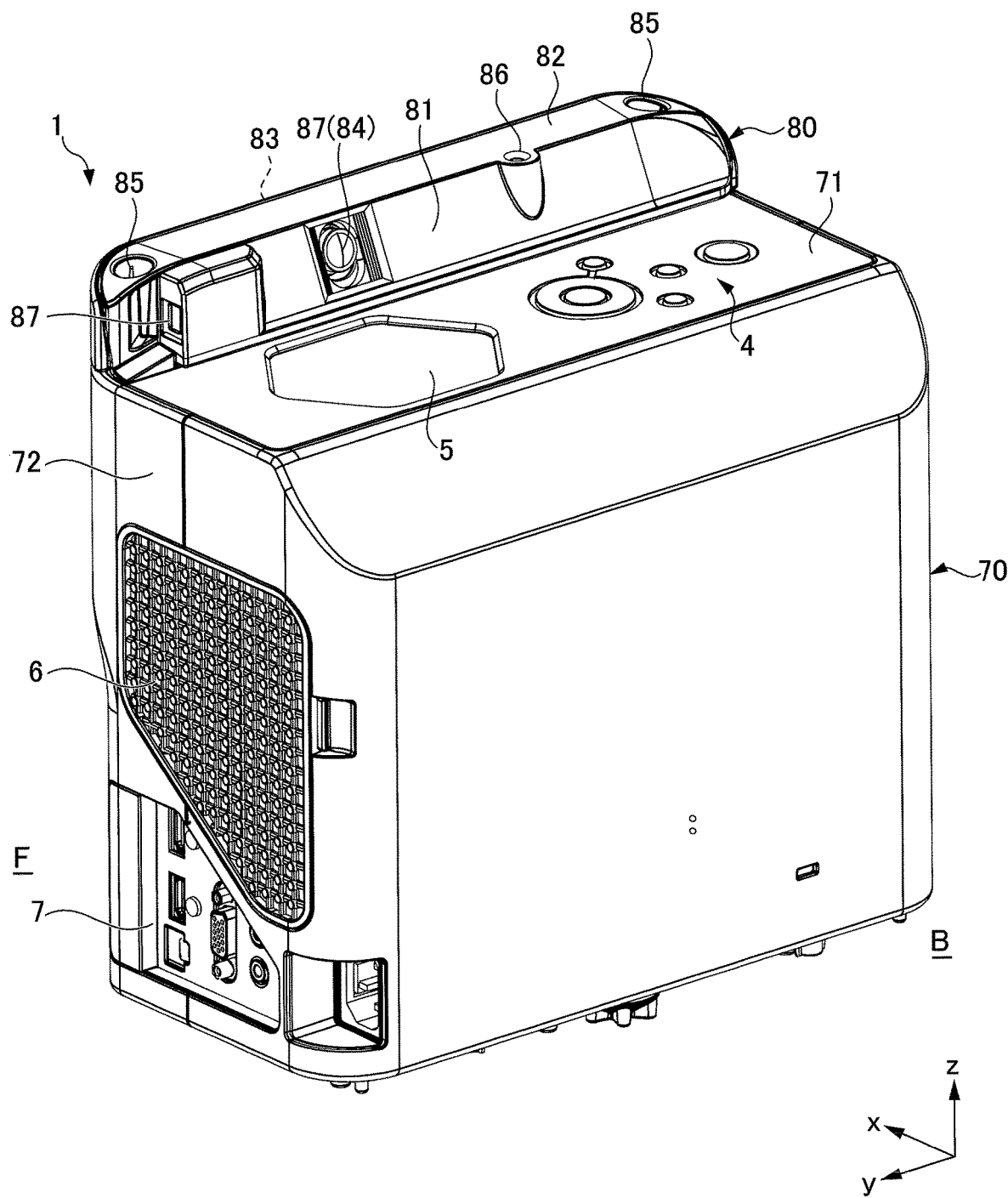
FIG. 11 is a perspective view of the overall configuration of the projection apparatus according to an embodiment of the present invention.
Figure 12:
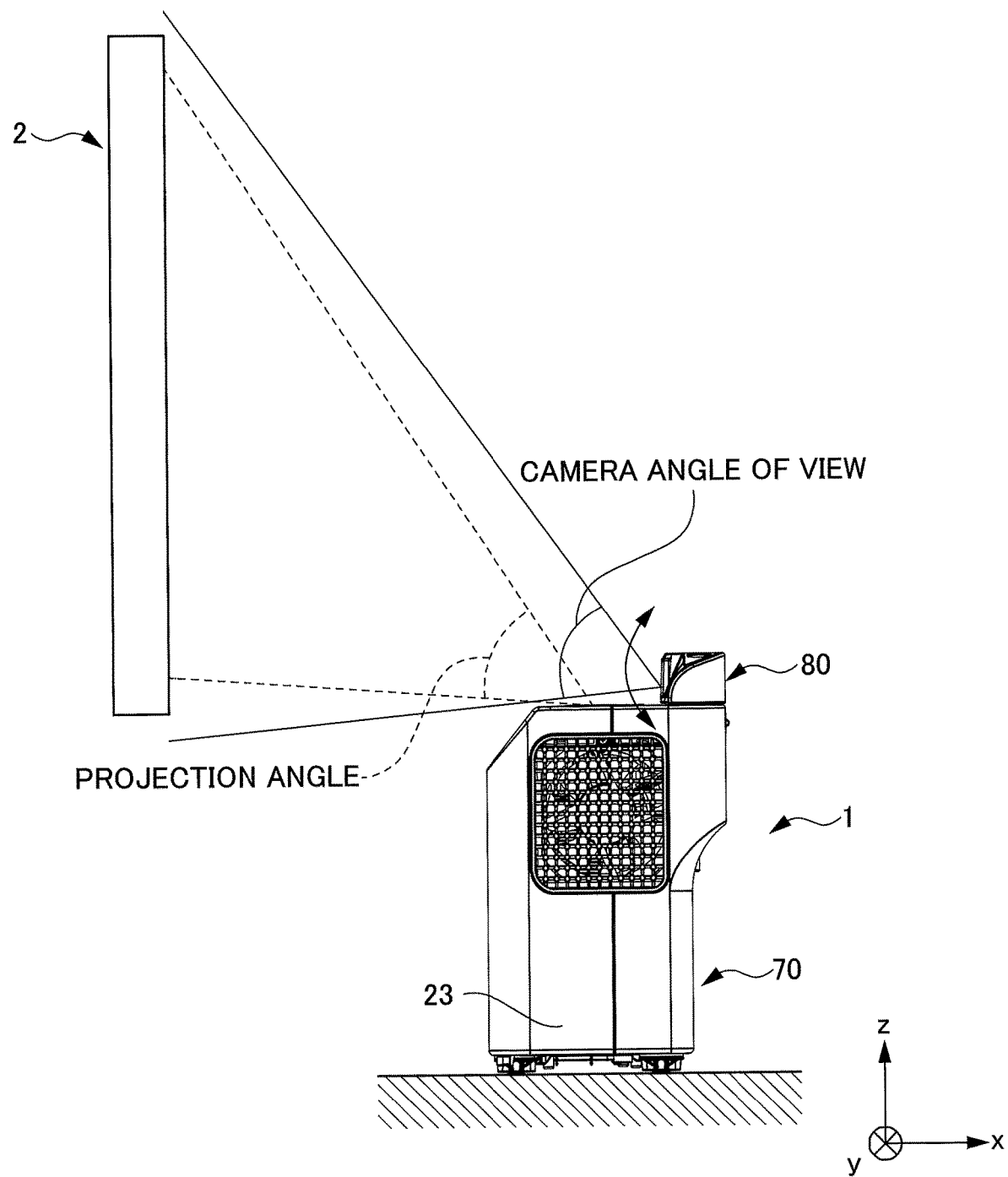
FIG. 12 is a side view illustrating the use of the projection apparatus according to an embodiment of the present invention.
Figure 13:
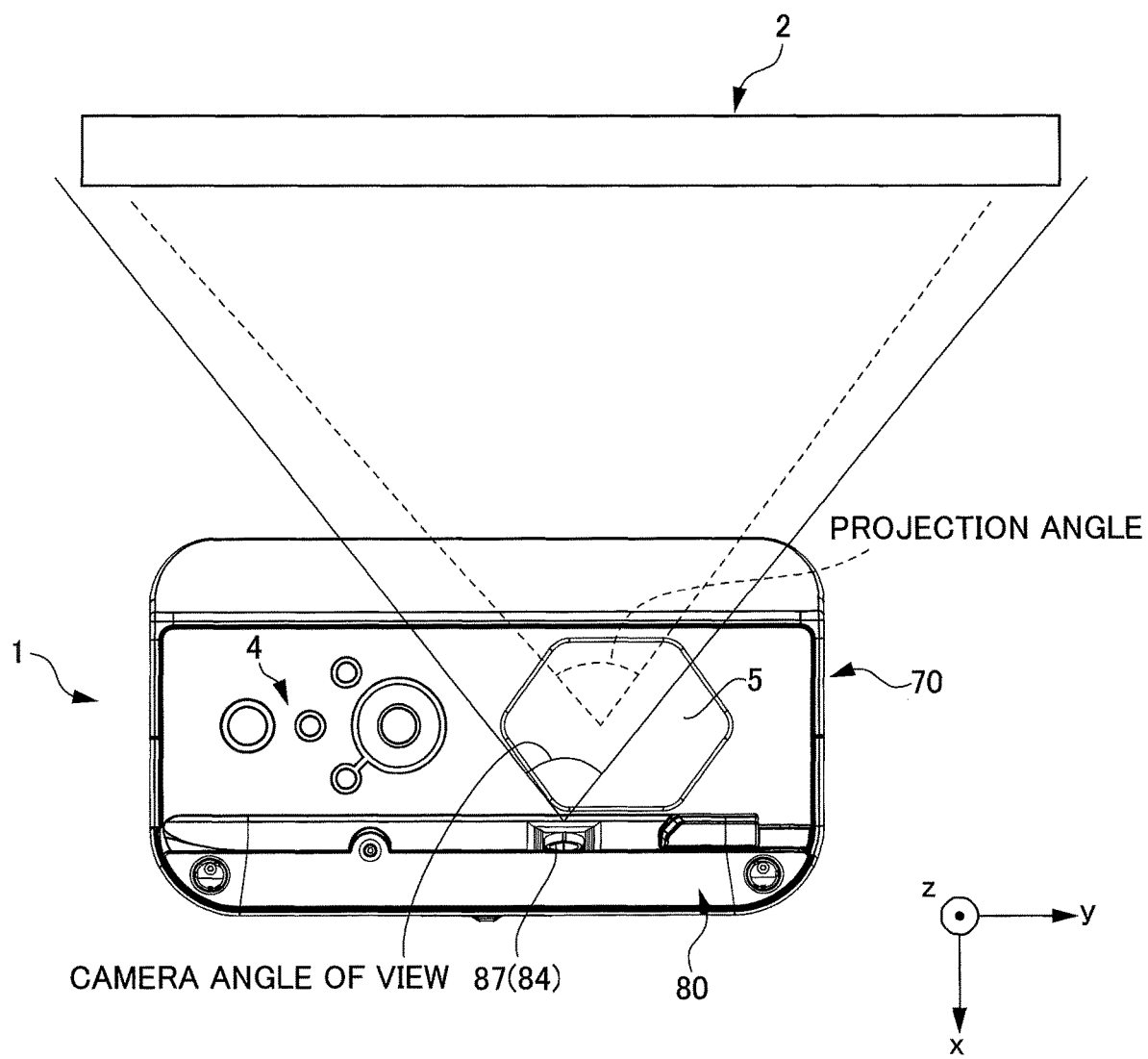
FIG. 13 is a plan view illustrating the use of the projection apparatus according to an embodiment of the present invention.

FIG. 11 is a perspective view illustrating the overall configuration of the projection apparatus 1 according to an embodiment. FIG. 12 is a side view illustrating an embodiment of a mode of use of the projection apparatus 1. FIG. 13 is a plan view illustrating a mode of use of the projection apparatus 1.

As illustrated in FIG. 11, the projection apparatus 1 includes the detachable interactive module 80 that is attached to the main body unit 70. The interactive module 80 is mounted on the upper surface 71 (mounting surface) of the main body unit 70, i.e., on the same surface as the operation unit 4 and the projection port 5 of the main body unit 70. The interactive module 80 is positioned to protrude upward (the z positive direction side) from the upper surface 71.

The interactive module 80 (operation detection apparatus) is an apparatus for enabling an operator to operate the projection screen of the projection apparatus 1 (e.g., inputting handwritten characters, etc.). The interactive module 80 includes an imaging unit 84 (an imager), (in FIGS. 11, 13, and 14, only a lens 87 of the imaging unit 84 is illustrated) such as an infrared detection camera. The interactive module 80 captures the entire projection screen by the lens 87 of the imaging unit 84 and implements an interactive function using the captured image. In this case, the interactive module 80 acquires the captured image of the projection screen as operation information that is information pertaining to the operation on the projection screen by the operator, and detects an operation with respect to the projection screen by the operator.

For this reason, for example, as illustrated in FIG. 12, in the side view, in the imaging unit 84, the imaging direction of the lens 87 is defined so as to accommodate the entire projection image output from the main body unit 70, within the range of the camera angle of view, and the range of the camera angle of view is rotatably formed about the y axis. Accordingly, it is possible to adjust the range of the camera angle of view to match the projection image. The camera angle of view can be adjusted by a "tilt position adjustment mechanism" described below with reference to FIGS. 20 to 28, for example.

Similarly, as illustrated in FIG. 13, in a plan view, in the imaging unit 84, an imaging direction of the lens 87 is defined such that the entire projection image output from the main body unit 70 is accommodated within the range of the camera angle of view. Preferably, the center of each projection of the projection port 5 and the y direction position of the center of the camera angle of view of the imaging unit 84 are the same. Accordingly, the projection image can be reliably accommodated in the camera angle of view of the imaging unit 84.

As illustrated in FIGS. 1 and 12, the projection apparatus 1 of the present embodiment can be located so that the distance from the projection port 5 to the screen 2 is extremely short as compared to a conventional projection apparatus due to the structure described with reference to FIGS. 2 to 10. Further, with the projection apparatus 1 according to the present embodiment, not only can the projection distance be short, but the screen size of the screen 2 can also be sufficiently large. For example, when the distance between the back side of the main body unit 70 on the side facing the screen 2 (the x negative direction side) and the projection surface of the screen 2 is 11.7 cm, 48-inch projection is possible. Further, the throw ratio (the ratio of the horizontal size of the projection screen to the projection distance) can be 0.7 or less, and preferably approximately 0.24. In the present embodiment, the projection apparatus 1 having such characteristics is defined as an "ultra-short-focus type" or a "super-close-projection type".

Figure 14:
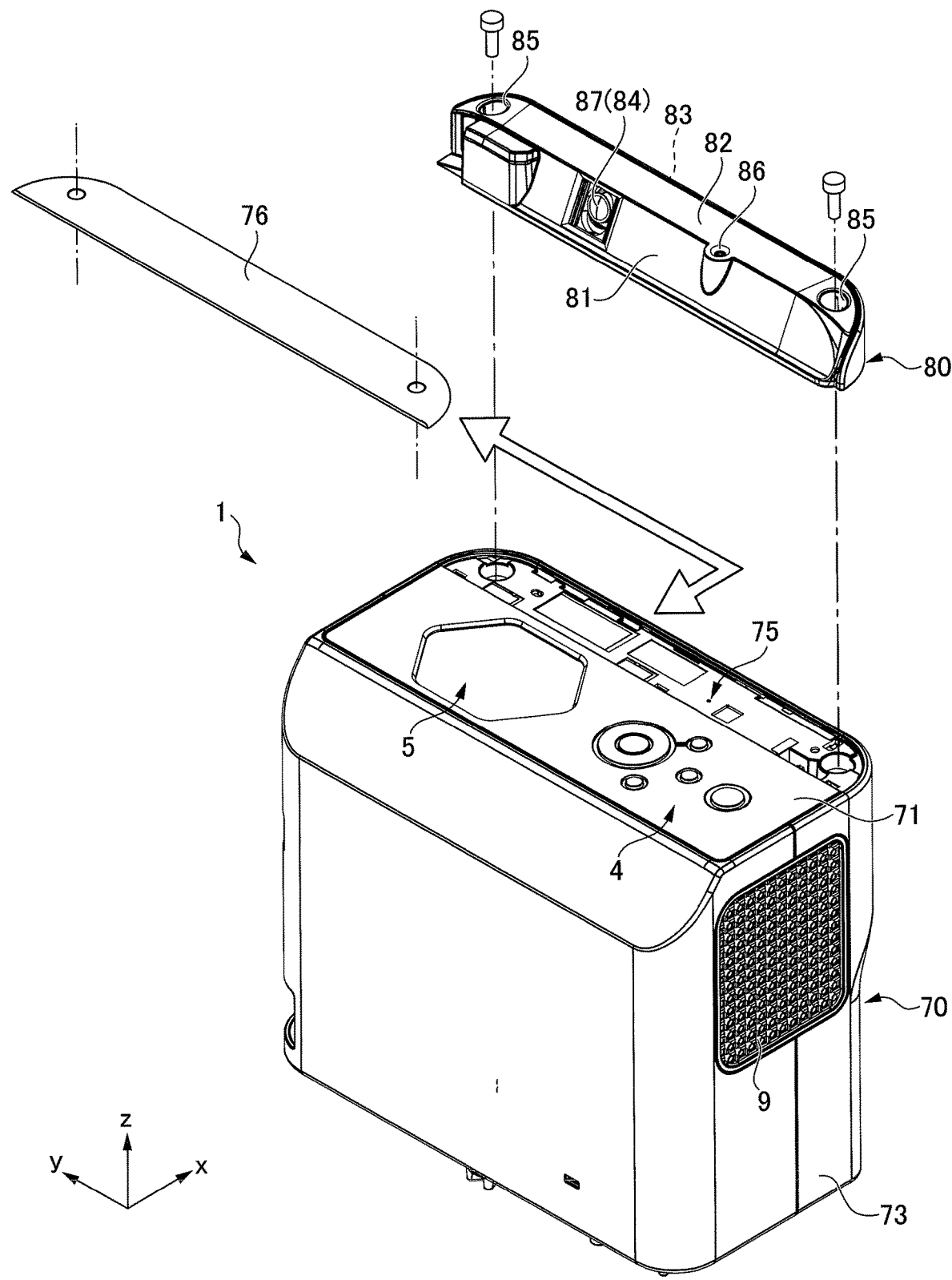
FIG. 14 is an exploded perspective view of the projection apparatus illustrated in FIG. 11 according to an embodiment of the present invention.
Figure 15:
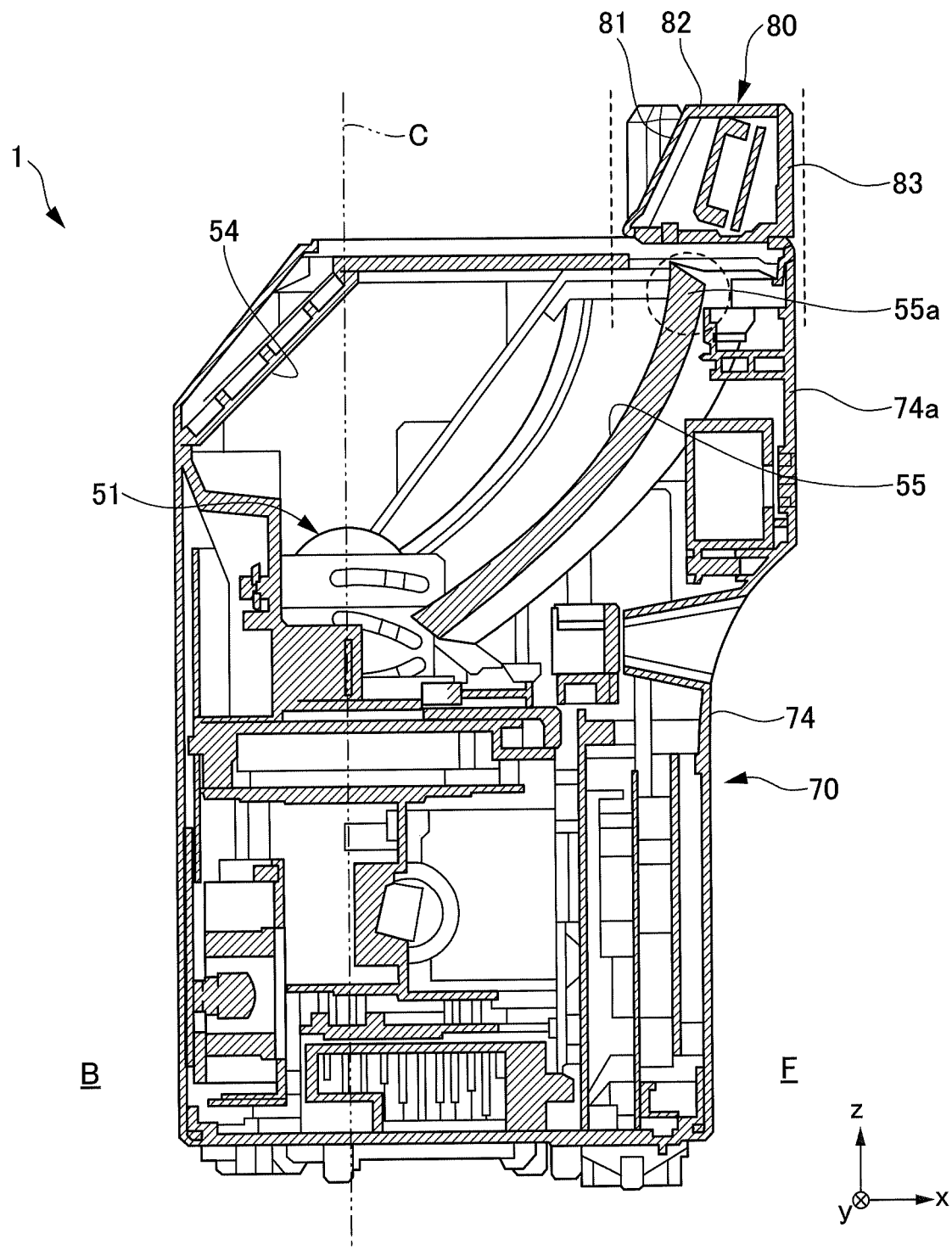
FIG. 15 is a cross-sectional view of the projection apparatus illustrated in FIG. 11 according to an embodiment of the present invention.

FIG. 14 is an exploded perspective view of the projection apparatus 1 illustrated in FIG. 11. FIG. 15 is a cross-sectional view of the projection apparatus 1 illustrated in FIG. 11. The cross-sectional view of FIG. 15 is a cross-section along the xz plane, for example, such that the projection port 5 in the y direction in FIG. 11 is present.

As illustrated in FIG. 14, the interactive module 80 is configured to be detachable from the main body unit 70. An attachment portion 75 for attaching the interactive module 80 is provided on the upper surface 71 of the main body unit 70. When the interactive module 80 is removed from the main body unit 70, a lid portion 76 is attached to the attachment portion 75. The lid portion 76 is formed such that the lid portion 76 and the upper surface 71 become flush. Both the lid portion 76 and the interactive module 80 can be screwed onto the attachment portion 75. A part of the attachment portion 75 is provided with two screw holes as fasteners. As illustrated by the dashed-dotted lines, the screw holes in the attachment portion 75 are commonly used for attaching the lid portion 76 and for attaching the interactive module 80.

The interactive module 80 is attached to the attachment portion 75 in a state where the lid portion 76 is removed from the upper surface 71, and the interactive module 80 is attached so as to stand upward (the z positive direction) from the upper surface 71. As described above, the attachment portion 75 for attaching the interactive module 80 is provided on the surface (the upper surface 71) on which the projection port 5 of the main body unit 70 of the projection apparatus 1 is provided, so that the interactive module 80 can be mounted externally (i.e., outside the main body unit 70) on the same plane as the projection port 5 and the operation unit 4. As described above, the attachment portion 75 is provided on the surface (the upper surface 71) on which the projection port 5 is provided, to serve as the surface for mounting the interactive module 80. Accordingly, it is not necessary to provide a space for mounting the module inside the main body unit 70 of the projection apparatus 1, and, therefore, the size of the main body unit 70 can be prevented from being increased, and the interactive function can be added without affecting the arrangement of the optical components inside the main body unit 70. As a result, according to the present embodiment, the projection apparatus 1 that has a compact size and that has an interactive function can be implemented.

The attachment portion 75 is disposed on the upper surface 71 on the side opposite to the side facing the projection screen, with the projection port 5 located between the attachment portion 75 and the projection screen (i.e., across the projection port 5). Preferably, the position of the attachment portion 75 on the upper surface 71 is provided so that the interactive module 80 is positioned at the end portion on the front side (the x positive direction side) of the upper surface 71 of the main body unit 70, as illustrated in FIG. 15. This allows the interactive module 80 to be disposed at the back side (the x positive direction side) than the projection port 5 with respect to the projection surface, so that the entire projection surface can be easily captured.

When attached to the attachment portion 75, the interactive module 80 does not protrude outwardly from the contour of the upper surface 71 when viewed from the normal direction (the z direction) of the upper surface 71, and the interactive module 80 is disposed along the outer rim of the upper surface 71 on the side opposite to the side facing the projection screen, with the projection port 5 located between the attachment portion 75 and the projection screen (i.e., across the projection port 5). Accordingly, the interactive module 80 can be installed so as not to protrude outward from the side surface of the main body unit 70, and, therefore, an external device can be installed and the function can be expanded without impairing the appearance of the projection apparatus 1. Further, it is possible to maintain convenience such as portability.

In a plan view from the z direction, the interactive module 80 is positioned so as to overlap with an end portion 55a on the front side F of the free curved mirror 55 within the main body unit 70 (the portion enclosed in a circle in FIG. 15). Preferably, a front surface 83 on the front side F of the interactive module 80 and a surface 74a on the front side F of the main body unit 70 are arranged to be flush.

Here, in FIG. 15, the optical axis C of the projection lens 51 is illustrated with a dashed-two dotted line. With respect to the arrangement of the interactive module 80, the definition of using the optical axis C as a reference will be described.

(1) The projection apparatus 1 includes the free curved mirror 55. The reflected light reflected from the free curved mirror 55 passes through the projection port 5 and is projected onto the projection surface of the screen 2. In the present embodiment, the portion of the aforementioned free curved mirror 55 that is furthest away from the projection surface (the portion surrounded by a circle in FIG. 15; the end portion 55a) is positioned within a range of a predetermined width (illustrated as an area between the two dashed lines in FIG. 15) of the interactive module 80 in the direction perpendicular to the optical axis C of the projection lens 51 (in the direction in which the front side F and the back side B face each other; the x direction).

(2) The interactive module 80 protrudes from the same plane (the upper surface 71) as the projection port 5 along the direction (the z positive direction) of the optical axis C of the projection lens 51.

In the cross-sectional view of FIG. 15, all cross-sections are represented by metal hatching, but each component may be formed of a material other than metal.

Figure 16:
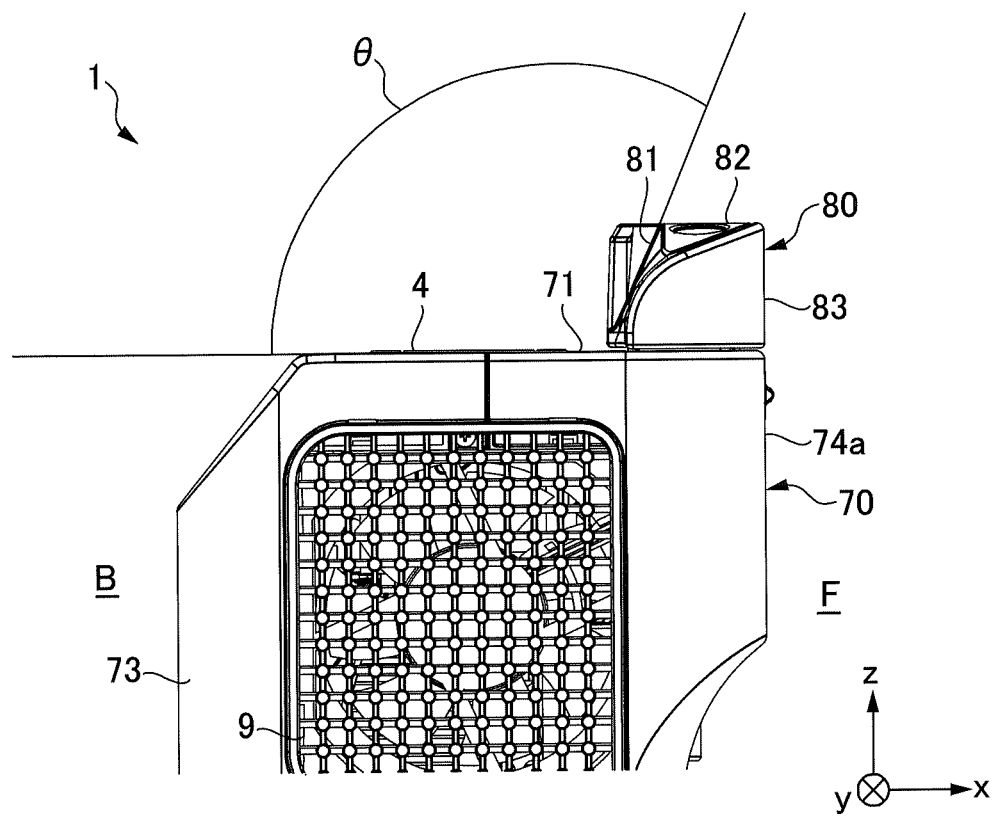
FIG. 16 is a side view of an interactive module with an enlarged view of the camera surface according to an embodiment of the present invention.

FIG. 16 is a side view illustrating an enlarged view of a camera surface 81 of the interactive module 80. As illustrated in FIG. 16, the interactive module 80 is substantially shaped as a rectangular parallelepiped in which the y axis direction is the longitudinal direction, and includes the camera surface 81 in which the imaging unit 84 is exposed in the x negative direction side, the front surface 83 facing the x positive direction side opposite to the camera surface 81, and a upper surface 82 facing the z positive direction side. The camera surface 81 is formed so that the normal direction thereof is tilted from the x negative direction to the z positive direction (upward). That is, the upper portion (the end portion in the x positive direction side) of the camera surface 81 facing the projection direction included in the interactive module 80 is formed by a tilted surface tilted toward the opposite side (the x positive direction side) to the projection direction from the projection port 5. That is, when the interactive module 80 is mounted to the main body unit 70, an angle θ between the upper surface 71 of the main body unit 70 and the camera surface 81 of the interactive module 80 is obtuse. The angle θ is, for example, 115°.

As described above, the characters described on the operation unit 4 are vertically oriented in the correct direction when viewed from the front side F. Therefore, the operator of the projection apparatus 1 mainly operates the operation unit 4 from the front side F of the main body unit 70. In this case, the interactive module 80 is disposed at the end portion of the front side F of the upper surface 71 of the main body unit 70 and protrudes upward from the upper surface 71 of the main body unit 70, and, therefore, there is a risk that the interactive module 80 will interfere with the visibility of the operation unit 4 from the operator. However, in the present embodiment, the camera surface 81 is tilted to the front side F, so that the operation unit 4 can be easily seen from the front side F.

Figure 17:
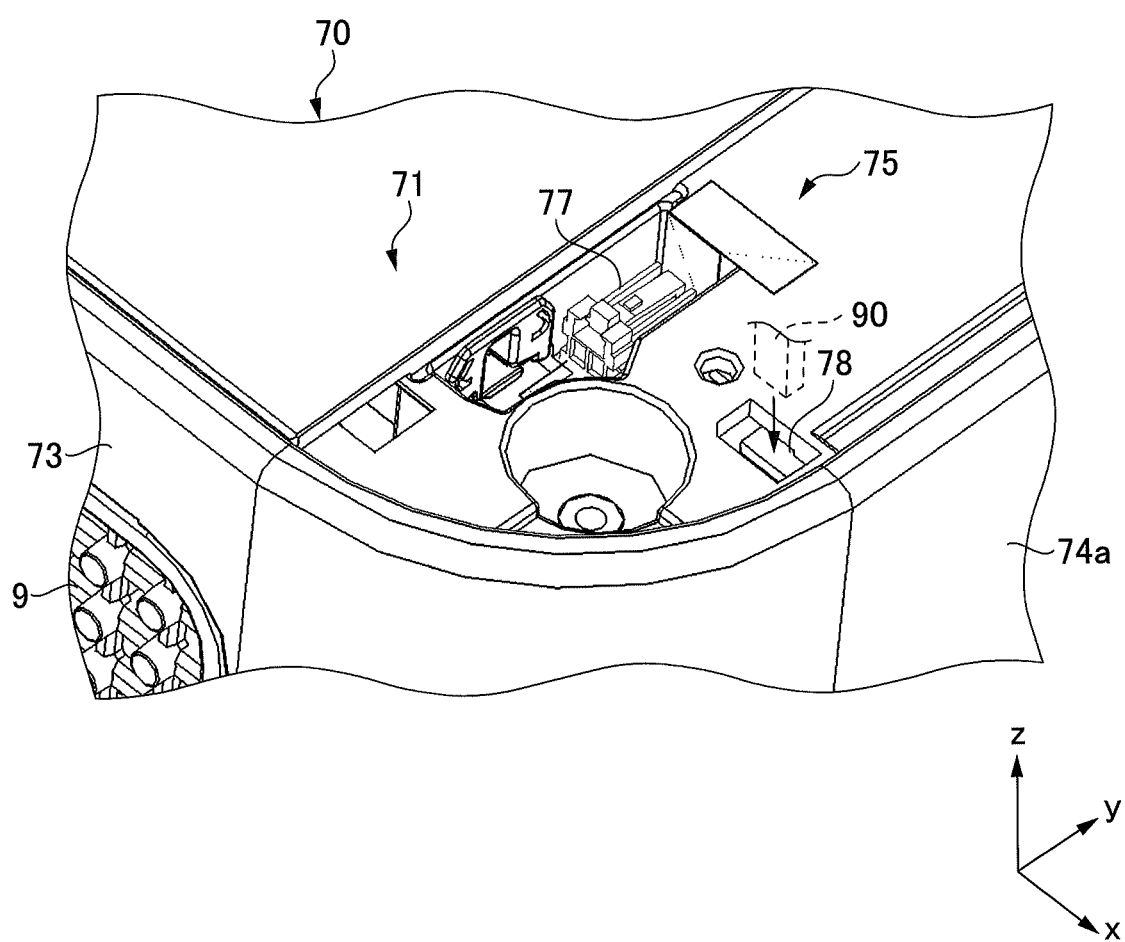
FIG. 17 is a perspective view of the attachment portion of the main body unit with an enlarged view of the coupling portion with the interactive module according to an embodiment of the present invention.
Figure 18:
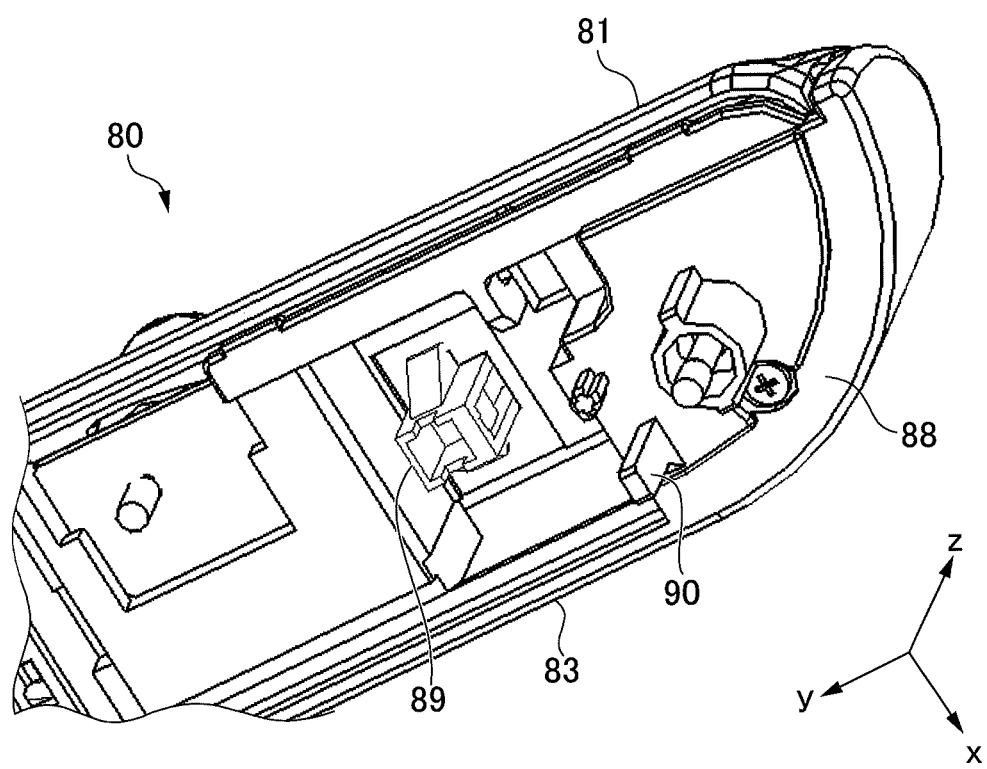
FIG. 18 is a perspective view of the bottom surface of the interactive module with an enlarged view of the coupling portion with the main body unit according to an embodiment of the present invention.

In the present embodiment, when the interactive module 80 is attached to the attachment portion 75, the interactive module 80 is electrically coupled to the main body unit 70 and is driven by receiving power supply from the main body unit 70. Referring to FIGS. 17 and 18, this electrical coupling method will be described. FIG. 17 is a perspective view illustrating an enlarged view of the coupling portion with the interactive module 80, of the attachment portion 75 of the main body unit 70. FIG. 18 is a perspective view illustrating an enlarged view of a coupling portion with the main body unit 70, of a bottom surface 88 of the interactive module 80.

As illustrated in FIG. 17, the attachment portion 75 of the main body unit 70 is provided with a power supply connector 77 and a detection switch 78 (a detector). On the other hand, as illustrated in FIG. 18, a power receiving connector 89 and a protrusion 90 are provided on the bottom surface 88 of the interactive module 80. The power receiving connector 89 is coupled to the power supply connector 77 to electrically couple the main body unit 70 and the interactive module 80. The protrusion 90 protrudes downward from the bottom surface 88 (in the z negative direction) and is provided at a position overlapping the detection switch 78 of the attachment portion 75 when viewed in the z direction. The detection switch 78 is shaped as a flat plate, for example, and is configured to move up and down, and is usually (when the switch is OFF) mounted such that the main surface thereof faces upward. When the detection switch 78 is moved downward upon receiving an external force, the detection switch 78 is switched from OFF to ON. Thus, when the interactive module 80 is mounted to the attachment portion 75, the protrusion 90 can push the detection switch 78 downwardly to switch the detection switch 78 to the ON state.

In the present embodiment, even when the power receiving connector 89 is coupled to the power supply connector 77, when the detection switch is in the OFF state, the power is not supplied from the main body unit 70 to the interactive module 80. When the interactive module 80 is mounted to the attachment portion 75 and the detection switch is turned on, the power is supplied to the interactive module 80.

Further, the configuration may be set such that when the detection switch 78 is turned OFF, the power supply to each element in the main body unit 70 is also turned off. In this case, the protrusion 90 is similarly provided on the bottom surface of the lid portion 76 illustrated in FIG. 14, and by fitting the lid portion 76 to the attachment portion 75, the protrusion of the lid portion 76 switches the detection switch 78 to the ON state, so that power is supplied to the main body unit 70. That is, in the projection apparatus 1, when the interactive module 80 or the lid portion 76 is attached to the attachment portion 75 on the upper surface 71 of the main body unit 70, power is supplied to the main body unit 70 and the main body unit 70 becomes drivable.

Figure 19:
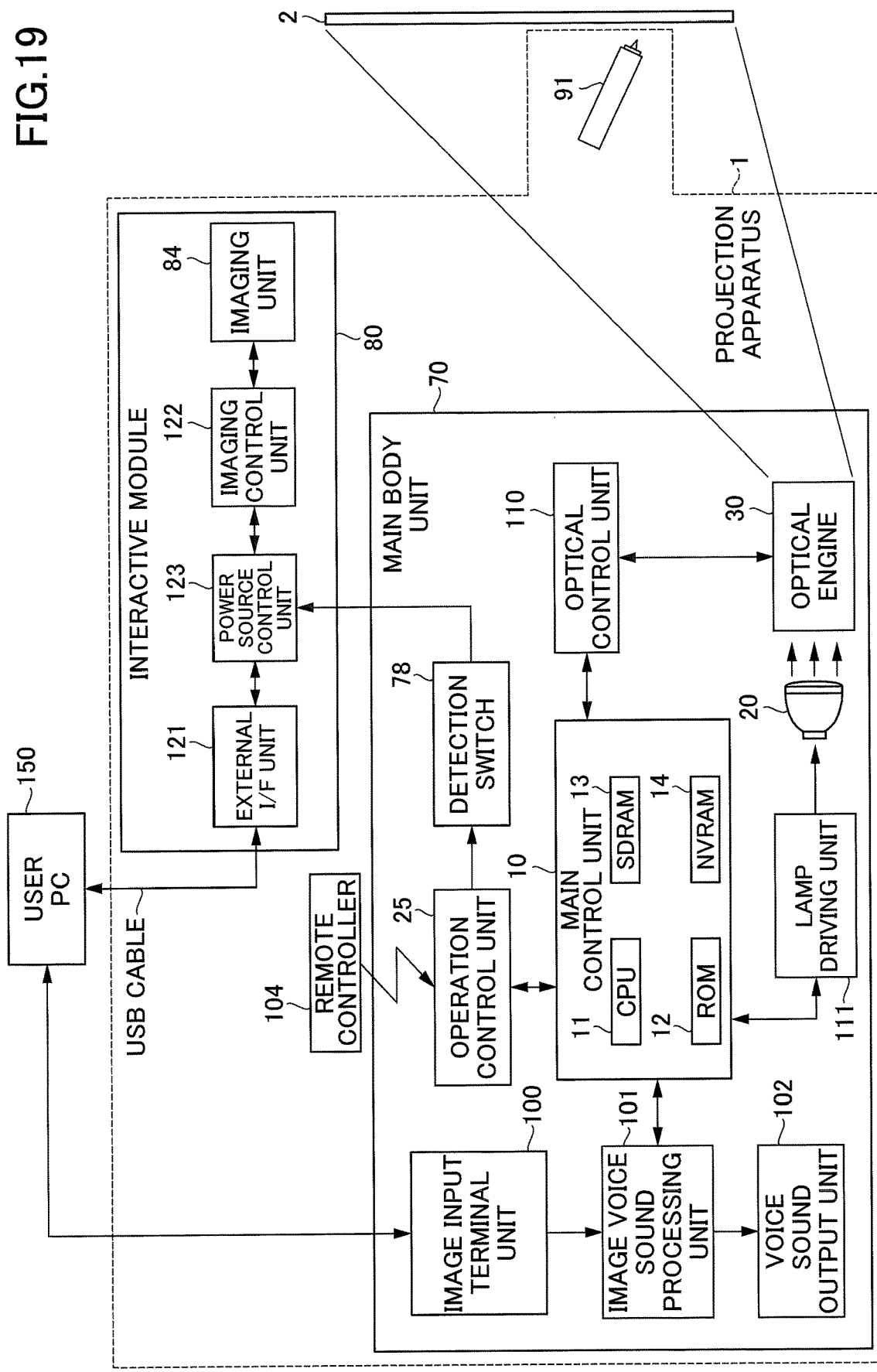
FIG. 19 is a block diagram illustrating the electrical coupling relationship of the projection apparatus according to an embodiment of the present invention.

FIG. 19 is a block diagram of the projection apparatus 1 illustrating electrical coupling relationships of the projection apparatus 1. As illustrated in FIG. 19, a user personal computer (PC) 150 is communicatively coupled to the main body unit 70 and the interactive module 80 of the projection apparatus 1. The user PC 150 supplies image data of the projection image to the main body unit 70 of the projection apparatus 1. The user PC 150 and the main body unit 70, as well as the user PC 150 and the interactive module 80, are interconnected via predetermined cables such as a High Definition Multimedia Interface (HDMI) cable or a Universal Serial Bus (USB) cable.

The projection apparatus 1 includes a remote controller device 104 (remote controller) that outputs commands by infrared signals for remote operation of the main body unit 70 and the interactive module 80, and an interactive pen 91 that is used by an operator when performing operations on the screen 2. The interactive pen 91 is switched on and emits infrared light when the tip is pressed during an operation on the screen 2, for example.

As an example, the wavelength of the infrared light emitted by the interactive pen 91 and the wavelength of the infrared light emitted by the remote controller device 104 are the same wavelength. The infrared signal from the remote controller device 104 is an example of an optical control signal, and a signal according to the infrared light emitted by the interactive pen 91 is an example of an indicator optical signal.

In this example, although both the remote controller device 104 and the interactive pen 91 use infrared light, optical signals of other wavelengths may be used.

The main body unit 70 includes a main control unit 10, an image input terminal unit 100, an image voice sound processing unit 101, a voice sound output unit 102, an operation control unit 25, an optical control unit 110, a lamp driving unit 111, the light source device 20, the optical engine 30, and the detection switch 78.

The main control unit 10 includes a central processing unit (CPU) 11, a Read-Only Memory (ROM) 12, a Synchronous Dynamic Random Access Memory (SDRAM) 13, and a Non-Volatile Random Access Memory (NVRAM) 14.

When the main body unit 70 is connected to a commercial power source and the detection switch 78 is turned on, power starts to be supplied to each unit of the main body unit 70 and the CPU 11 is activated according to a control program pre-stored in the ROM 12. Further, when the power is supplied to the operation control unit 25, the operation of the operation control unit 25 becomes possible. Further, projection of the projection image via the optical engine 30 becomes possible.

When the main body unit 70 is disconnected from the commercial power source, the CPU 11 turns off the light source device 20. The CPU 11 also stops controlling the optical engine 30 and terminates the control of the main body unit 70 after a predetermined period of time required for cooling the optical engine 30 elapses.

The interactive module 80 includes the imaging unit 84, an imaging control unit 122, a power source control unit 123, and an external interface (I/F) unit 121.

As described above, for example, an infrared detection camera device can be used as the imaging unit 84. The imaging unit 84 captures the entirety or a predetermined portion of the screen 2 (projection range) to form a captured image responsive to infrared light.

The imaging control unit 122 performs an infrared detection operation based on the captured image captured by the imaging unit 84. The imaging control unit 122 detects an instruction corresponding to an operation of the interactive pen 91 detected based on the captured image captured by the imaging unit 84.

The power source control unit 123 supplies power supplied from the main body unit 70 to each unit of the interactive module 80 while the detection switch 78 of the main body unit 70 is on. During this time, the interactive function by the interactive module 80 is executable.

With respect to the main body unit 70 and the interactive module 80 of the projection apparatus 1, for example, the detection switch 78 is disposed between the operation control unit 25 of the main body unit 70 and the power source control unit 123 of the interactive module 80. When the detection switch 78 is ON, the operation control unit 25 and the power source control unit 123 are electrically coupled to each other, and power is supplied from the main body unit 70 to the interactive module 80.

The external I/F unit 121 transmits, to the user PC 150, an instruction signal representing an instruction corresponding to an operation of the interactive pen 91 detected by the imaging control unit 122.

According to the present embodiment, the interactive module 80 is configured to detect the operation of the interactive pen 91 (for example, inputting handwritten characters) on the projection screen based on the captured screen of the projection image captured by the imaging unit 84. However, other functions can be performed using the captured screen captured by the imaging unit 84. For example, the interactive module 80 or the user PC 150 may implement a function for performing the trapezoidal correction of the projection image using the data of the projection image in the captured screen captured by the imaging unit 84.

<Tilt Angle Adjustment Mechanism>

Referring now to FIGS. 20 to 28, the tilt angle adjustment mechanism of the interactive module 80 will be described. In the present embodiment, the "tilt angle" refers to the angle formed between the optical axis of the imaging unit 84 of the interactive module 80 and the projection surface of the screen 2.

Figure 20:
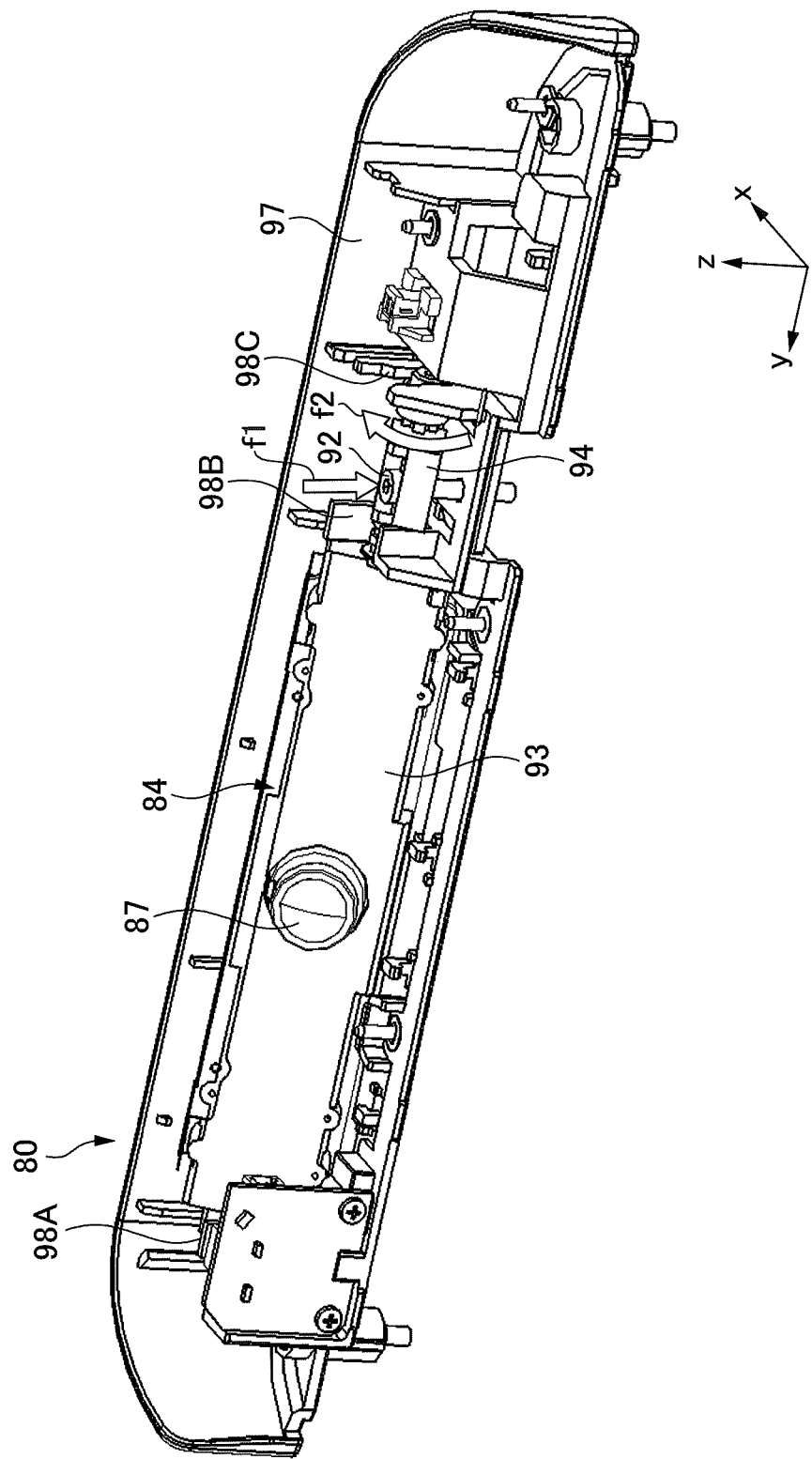
FIG. 20 is a diagram illustrating the internal configuration of the interactive module according to an embodiment of the present invention.
Figure 21:
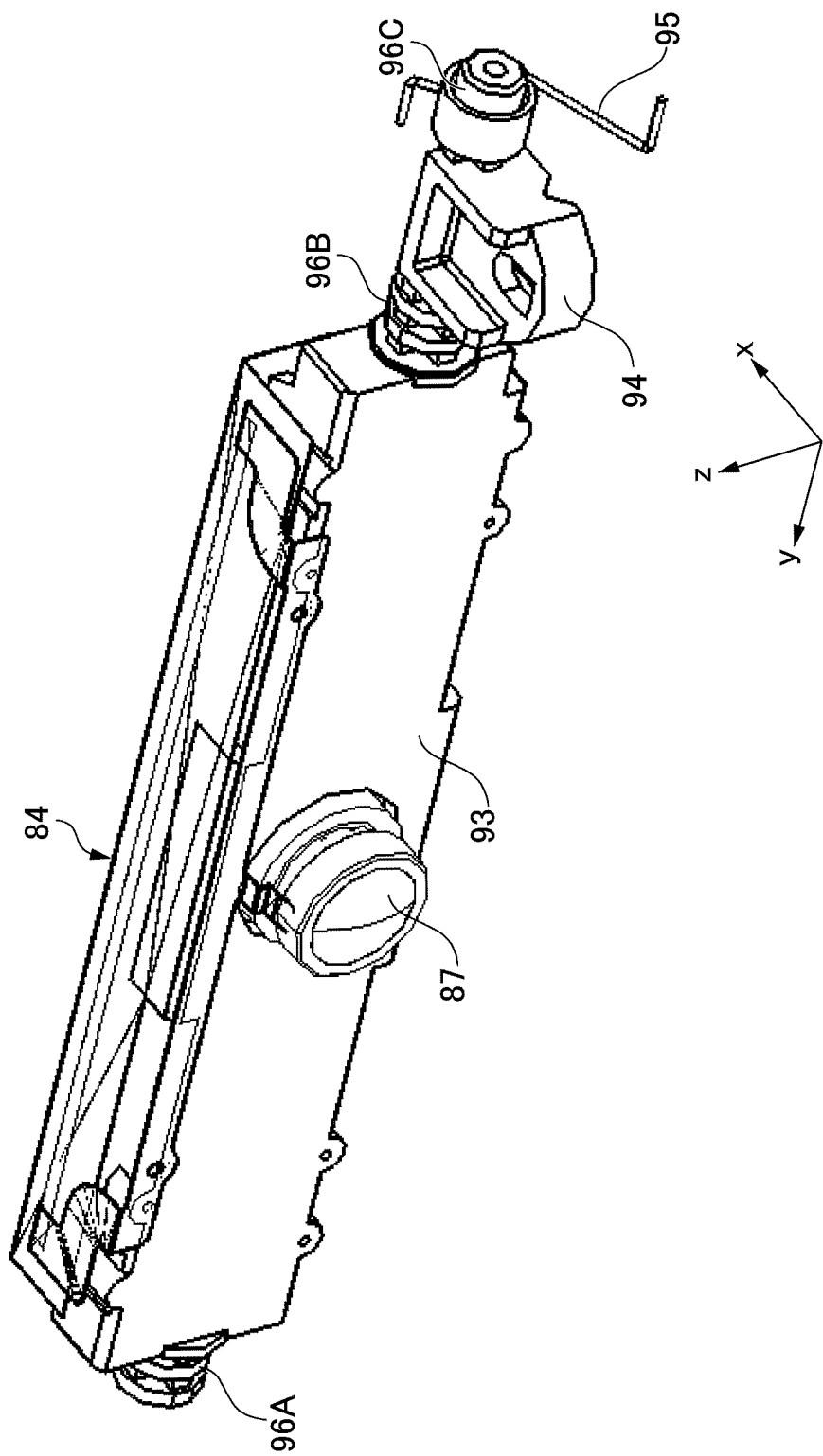
FIG. 21 is a perspective view of the imaging unit according to an embodiment of the present invention.
Figure 22:
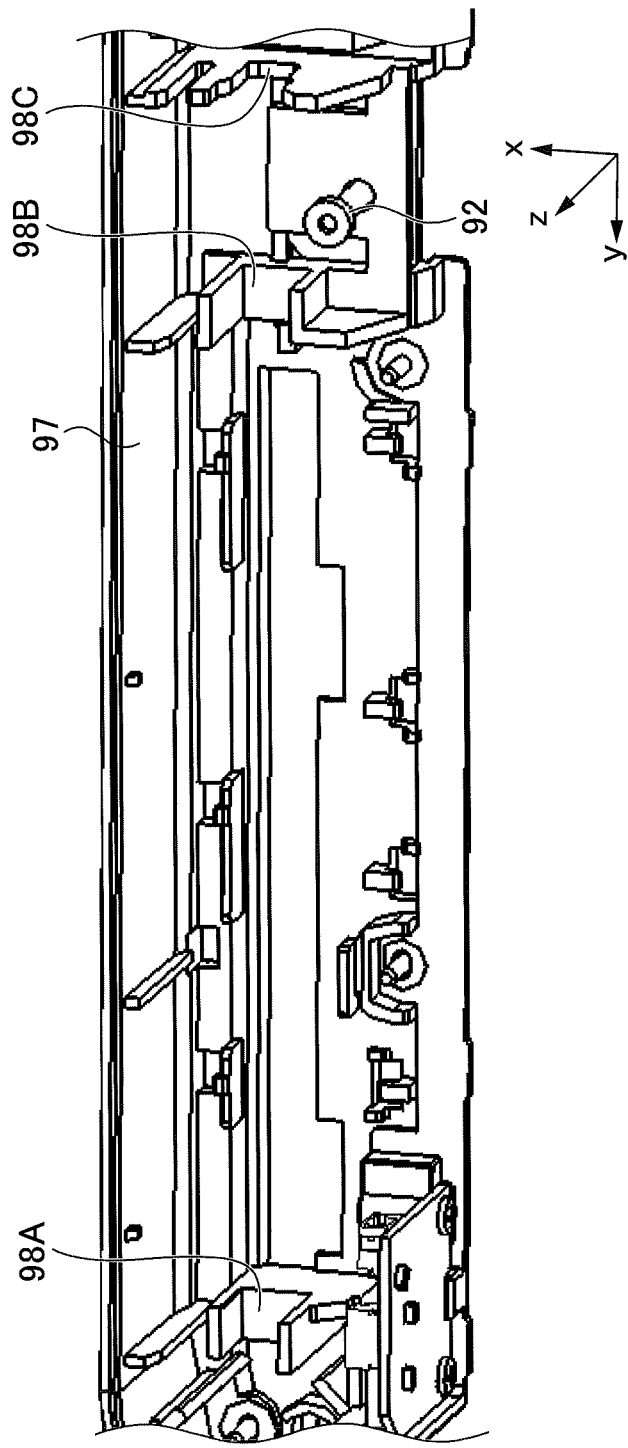
FIG. 22 is a perspective view of an interactive module with the imaging unit removed according to an embodiment of the present invention.

FIG. 20 is a diagram illustrating an internal configuration of the interactive module 80. FIG. 21 is a perspective view of the imaging unit 84. FIG. 22 is a perspective view of the interactive module with the imaging unit 84 removed.

As illustrated in FIG. 20, the interactive module 80 includes the imaging unit 84, a housing 97, and an adjusting screw 92 therein.

As illustrated in FIG. 21, the imaging unit 84 includes a camera main body 93, a screw receiver 94, and a torsion spring 95. As illustrated in FIGS. 20 and 21, the lens 87 is provided on the camera main body 93. The camera main body 93 and the screw receiver 94 are arranged in series along the y direction, and a substantially cylindrical coupling portion between the camera main body 93 and the screw receiver 94 functions as a pivoting portion 96B. A pivoting portion 96A having the same shape as the pivoting portion 96B is provided on the end surface of the camera main body 93 on the y positive direction side opposite to the pivoting portion 96B in the y direction. A pivoting portion 96C having the same shape as the pivoting portion 96B is provided on the end surface of the screw receiver 94 on the y negative direction side opposite to the pivoting portion 96B in the y direction.

The torsion spring 95 is attached to the pivoting portion 96C. The adjusting screw 92 is inserted into the hole of the screw receiver 94 from above and is screwed into the housing 97. The hole in the screw receiver 94 is formed so as to prevent the head of the adjusting screw 92 from passing through, and the head of the adjusting screw 92 is caught by the screw receiver 94.

In the housing 97, three support portions 98A, 98B, and 98C are provided. The support portions 98A, 98B, and 98C respectively support the pivoting portions 96A, 96B, and 96C of the imaging unit 84 so as to be pivotable.

In the imaging unit 84, the pivoting portions 96A, 96B, and 96C are placed on the support portions 98A, 98B, 98C of the housing 97. The imaging unit 84 is pivotable about the pivoting portions 96A, 96B, and 96C. The imaging unit 84 receives a force f2 to be raised upward by the torsion spring 95. That is, when the imaging unit 84 is installed in the housing 97, the imaging unit 84 is biased by the torsion spring 95 in a direction in which the optical axis of the camera main body 93 pivots upward.

The movement of raising the imaging unit 84 upward by this force f2 is held down by the adjusting screw 92, i.e., the movement is balanced by a reaction force f1 received by the screw receiver 94 from the head of the adjusting screw 92 at the contact portion between the adjusting screw 92 and the screw receiver 94, so that the pivoting of the imaging unit 84 is stopped and the optical axis direction is positioned. Accordingly, by rotating the adjusting screw 92 so that the position of the head in the z direction is moved between the upper and lower limits, the position of the contact portion in the z direction between the adjusting screw 92 and the screw receiver 94 can be changed, so that the optical axis direction (tilt angle) of the imaging unit 84 can be adjusted.

That is, in the present embodiment, the adjusting screw 92, the screw receiver 94, the torsion spring 95, the pivoting portions 96A, 96B, and 96C, and the support portions 98A, 98B, and 98C function as a tilt angle adjustment mechanism of the interactive module 80.

The adjusting screw 92 can be rotated by passing a driver through an adjustment hole 86 illustrated in FIG. 11 and the like. For this reason, even when the interactive module 80 is attached to the main body unit 70, the tilt angle adjustment mechanism can be easily operated via the adjustment hole 86 that opens in the upper direction, so that the optical axis direction (tilt angle) of the imaging unit 84 can be easily adjusted.

Referring to FIGS. 23 to 28, a change in the internal configuration of the interactive module 80 according to a change in the tilt angle will be described. Here, three examples in which the tilt angle is minimum, intermediate, and maximum will be described.

Figure 23:
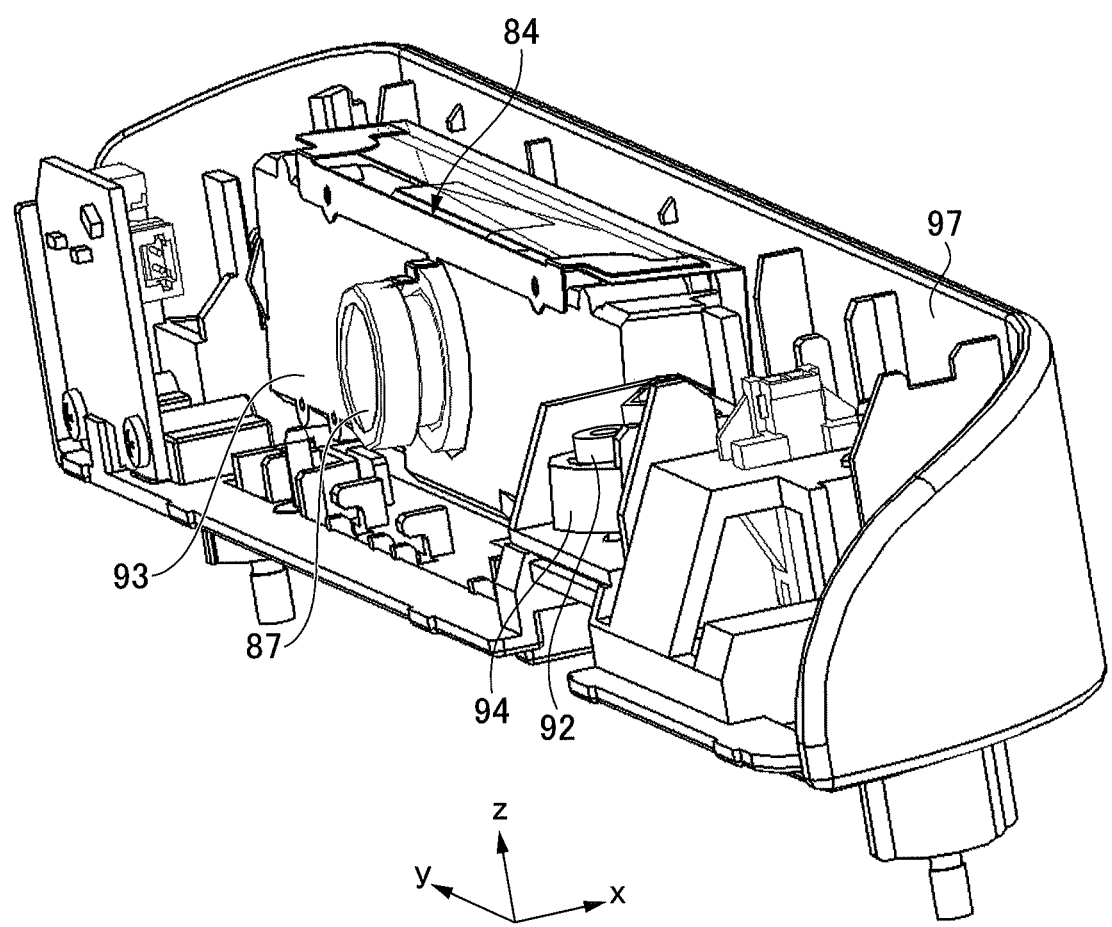
FIG. 23 is a perspective view illustrating a module internal configuration in which the tilt angle is minimum according to an embodiment of the present invention.
Figure 24:
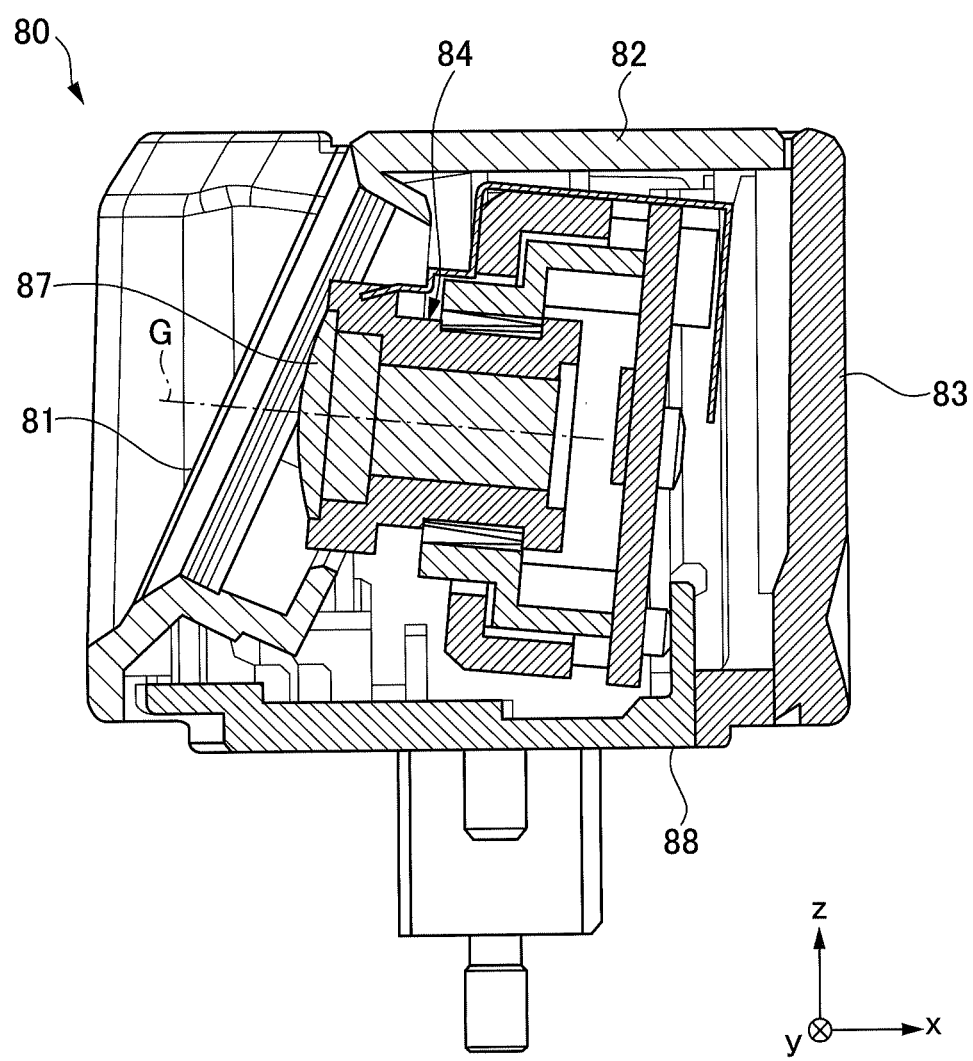
FIG. 24 is a cross-sectional view of the interactive module of the state illustrated in FIG. 23 according to an embodiment of the present invention.

FIG. 23 is a perspective view illustrating a module internal configuration in which the tilt angle is minimum. FIG. 24 is a cross-sectional view of the interactive module 80 of the state illustrated in FIG. 23.

As illustrated in FIG. 23, when the tilt angle is minimum, the head of the adjusting screw 92 is rotated to the bottom-most position. Therefore, as illustrated in FIGS. 23 and 24, the direction of the optical axis G of the camera main body 93 is positioned at an angle close to the horizontal direction. Note that "the optical axis G of the camera main body 93" can also be described as "the optical axis G of the lens 87" provided in the camera main body 93 or "the optical axis G of the imaging unit 84".

Figure 25:
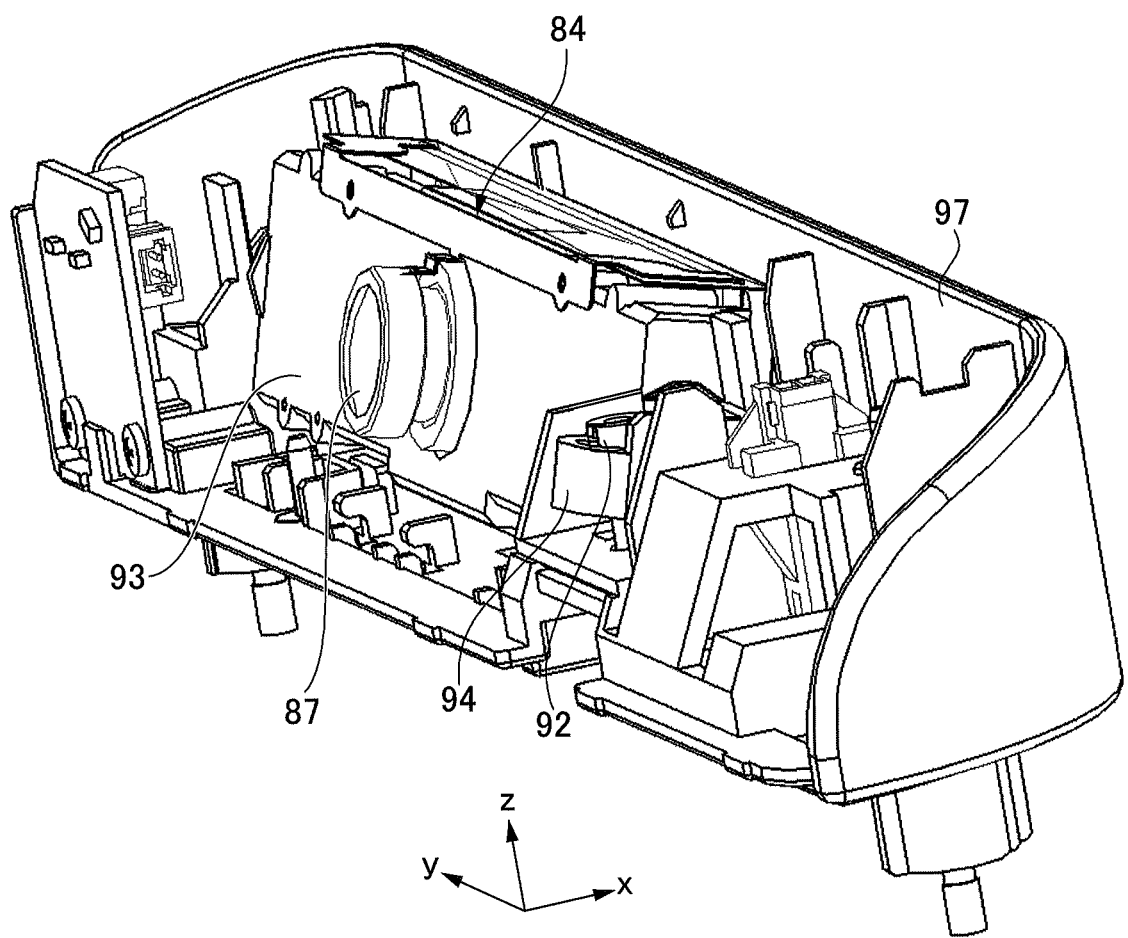
FIG. 25 is a perspective view illustrating a module internal configuration in which the tilt angle is intermediate according to an embodiment of the present invention.
Figure 26:
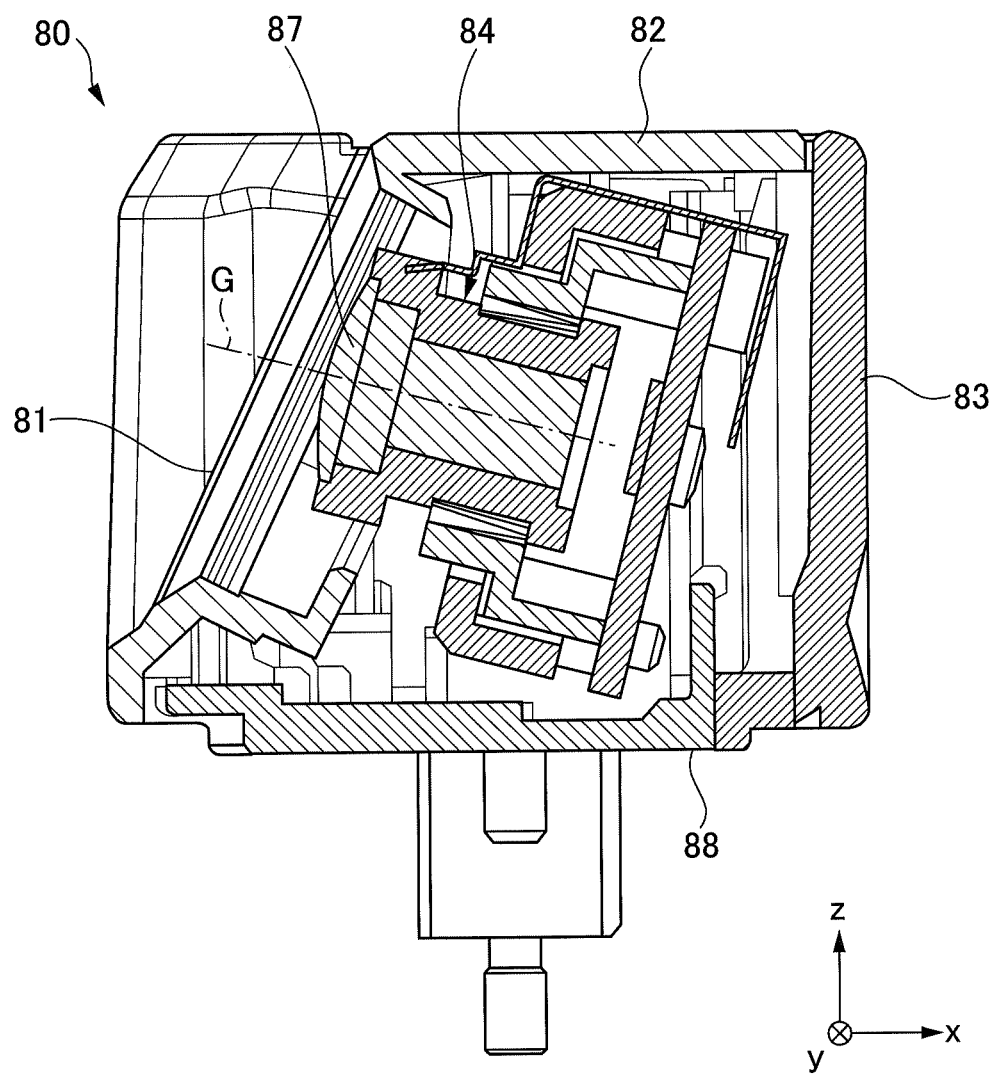
FIG. 26 is a cross-sectional view of the interactive module of the state illustrated in FIG. 25 according to an embodiment of the present invention.

FIG. 25 is a perspective view illustrating a module internal configuration in which the tilt angle is intermediate. FIG. 26 is a cross-sectional view of the interactive module 80 of the state illustrated in FIG. 25.

As illustrated in FIG. 25, when the tilt angle is intermediate, the head of the adjusting screw 92 is rotated to the intermediate position. Accordingly, as illustrated in FIGS. 25 and 26, the direction of the optical axis G of the camera main body 93 is positioned at an angle that is tilted upward from the horizontal direction.

Figure 27:
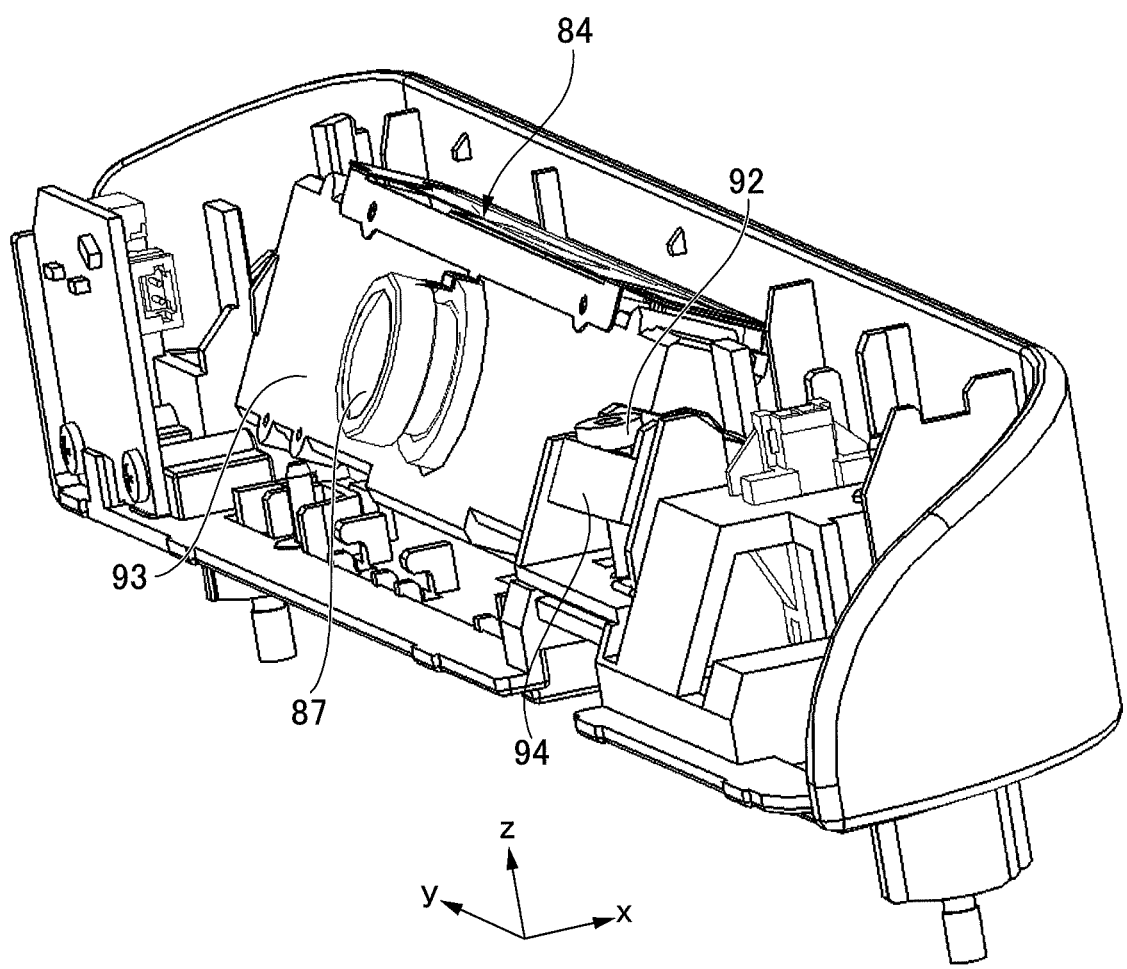
FIG. 27 is a perspective view illustrating a module internal configuration in which the tilt angle is maximum according to an embodiment of the present invention.
Figure 28:
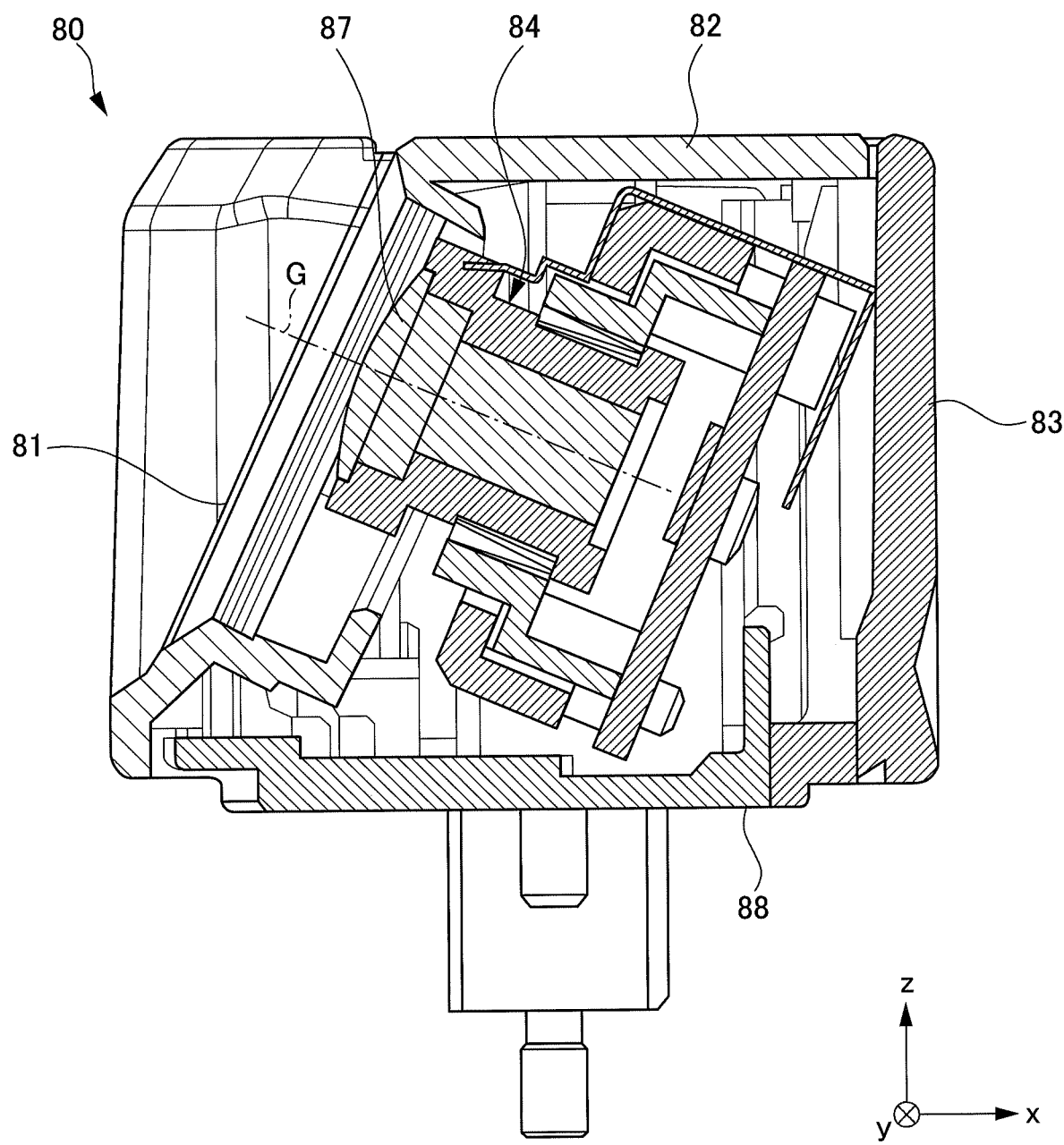
FIG. 28 is a cross-sectional view of the interactive module of the state illustrated in FIG. 27 according to an embodiment of the present invention.

FIG. 27 is a perspective view illustrating a module internal configuration in which the tilt angle is maximum. FIG. 28 is a cross-sectional view of the interactive module 80 of the state illustrated in FIG. 27.

As illustrated in FIG. 27, when the tilt angle is maximum, the head of the adjusting screw 92 is rotated to the topmost position. Accordingly, as illustrated in FIGS. 27 and 28, the direction of the optical axis G of the camera main body 93 is positioned at an angle greater than that of the intermediate position illustrated in FIGS. 25 and 26.

The effect of the interactive module 80 according to the present embodiment having such a tilt angle adjustment mechanism will be described. In the present embodiment, the interactive module 80 uses an infrared camera, and captures an image of the projection surface, detects infrared light of the projection surface within the image capturing range, and executes the interactive function. Further, in the present embodiment, the projection apparatus 1 is a so-called ultra-short focus projector, and the housing (the main body unit 70) is positioned at a distance proximate to the projection surface so that the light exiting from the projection port 5 is not blocked by a person.

As described above, in the case where the projection apparatus 1 to which the interactive module 80 is attached is of the ultra-short focus type, the projection angle from the projection port 5 is wider than that of a conventional projector because the projection surface is close to the housing (the main body unit 70). For this reason, the lens of the camera mounted in the interactive module 80 is required to have a wider angle than that of a general-purpose lens in order to capture the entire projection image having a wide projection angle. Therefore, when a wide-angle lens is applied to the camera of the module, a highly specialized camera is needed, which may be expensive. With a general-purpose lens, the camera angle of view is fixed to some extent.

Thus, in the present embodiment, the interactive module 80 is provided with a tilt angle adjustment mechanism for adjusting the tilt angle of the imaging unit 84. Accordingly, even when the existing lens 87 is used for the camera of the imaging unit 84, the imaging range can be adjusted by adjusting the tilt angle so that the entire projection image can be captured. Also, because the existing lens 87 can be applied to the imaging unit 84, the manufacturing cost can be reduced.

<Pen Holder>

Figure 29:
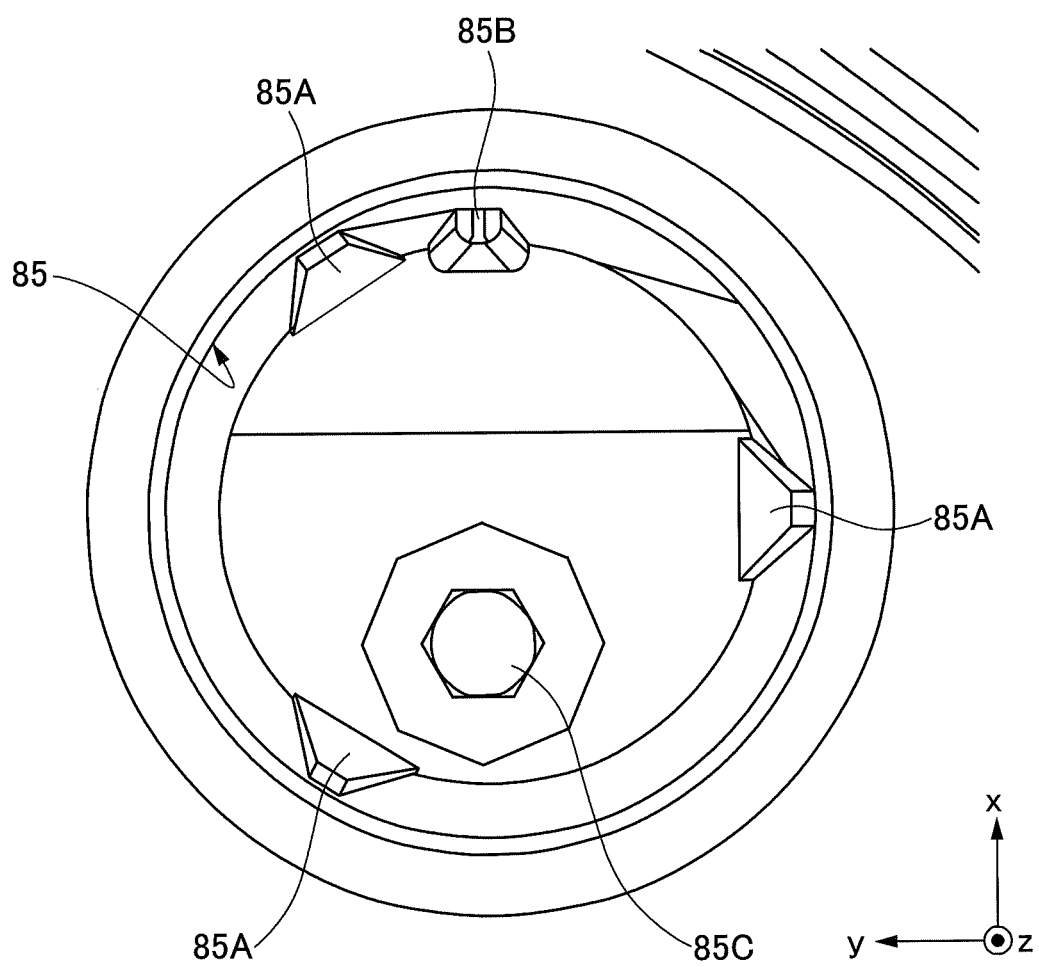
FIG. 29 is a plan view of an internal configuration of a pen holder according to an embodiment of the present invention.
Figure 30:
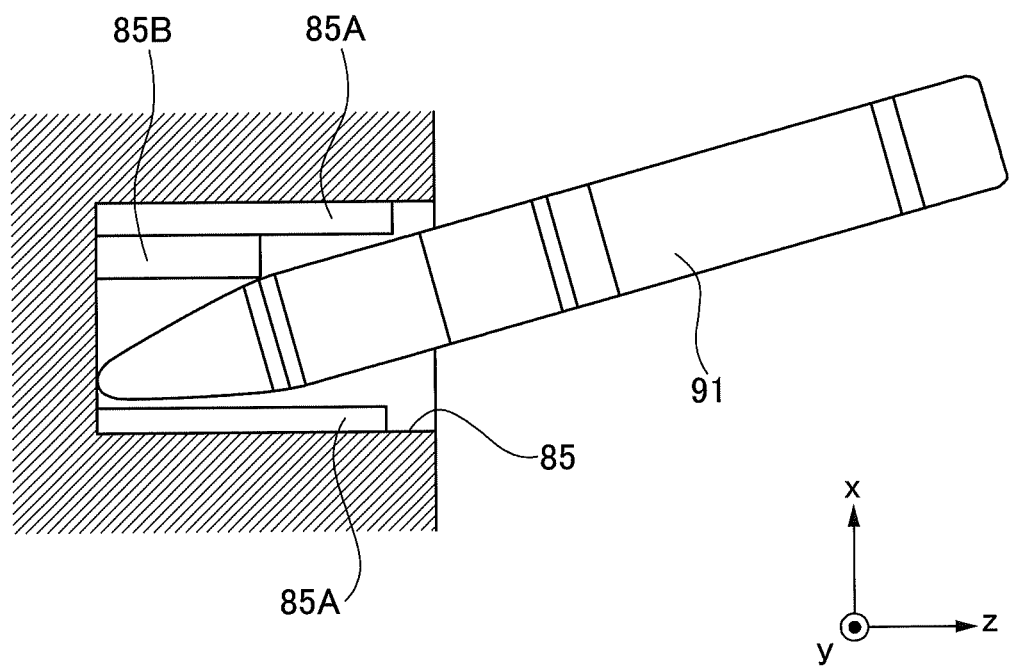
FIG. 30 is a cross-sectional view illustrating the support structure of the pen holder according to an embodiment of the present invention.
Figure 31:
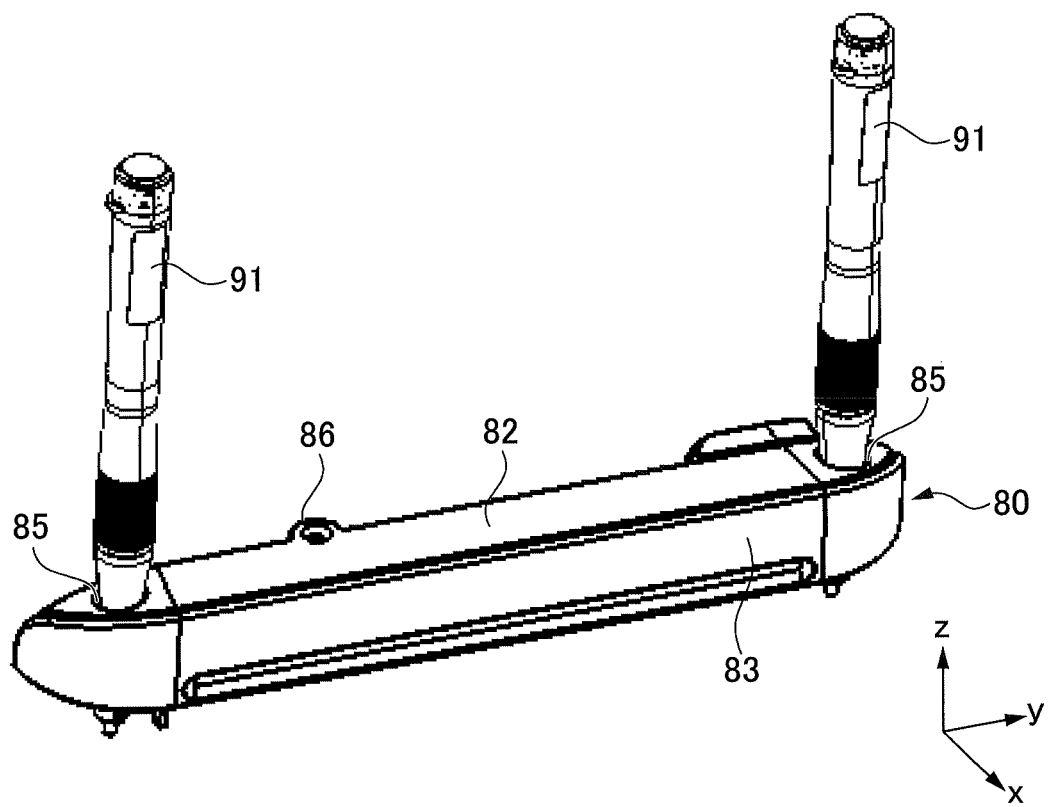
FIG. 31 is a perspective view illustrating the holding state of the interactive pen by the pen holder according to an embodiment of the present invention.

FIG. 29 is a plan view illustrating the internal configuration of a pen holder 85. FIG. 30 is a cross-sectional view illustrating the support structure of the pen holder 85. FIG. 31 is a perspective view illustrating a state in which the interactive pen 91 is held by the pen holder 85.

As illustrated in FIG. 29, the pen holder 85 of the interactive module 80 is provided with a screw hole 85C on the bottom surface thereof, and can fasten the interactive module 80 to the main body unit 70 by screws using an instrument such as a hex wrench from above. The pen holder 85 is formed to have an inner diameter greater than that of a screw or an instrument for turning the screw (such as a hex wrench), and is formed to have a size into which the interactive pen 91 can be inserted. As illustrated in FIG. 31, the leading end of the interactive pen 91 can be inserted into the pen holder 85 so that the interactive pen 91 is held upright along the z direction and the interactive pen 91 is held upright with respect to the operation unit 4.

As illustrated in FIGS. 29 and 30, retaining ribs 85A and a tilting direction restricting rib 85B are provided on the inner peripheral surface of the pen holder 85. The retaining ribs 85A protrude from the inner peripheral surface toward the axial center on the inner peripheral surface of the pen holder 85 near the bottom surface. The retaining ribs 85A are arranged such that a plurality (three in FIG. 29) of the retaining ribs 85A are provided substantially evenly around the axial center, thereby pinching the leading end of the interactive pen 91. The tilting direction restricting rib 85B is provided at one portion on the inner circumferential surface so as to protrude toward the axial center by a greater extent than the retaining rib 85A. Accordingly, as illustrated in FIG. 30, when the leading end of the interactive pen 91 is inserted into the pen holder 85, a force is applied to the leading end of the interactive pen 91 in one direction (the x negative direction in FIG. 30) of the radial direction of the hole shape of the pen holder 85 to move the position of the leading end in the radial direction, thereby restricting the tilt direction of the interactive pen 91 protruding from the pen holder 85 to a predetermined direction (the x positive direction in FIG. 30).

Figure 32:
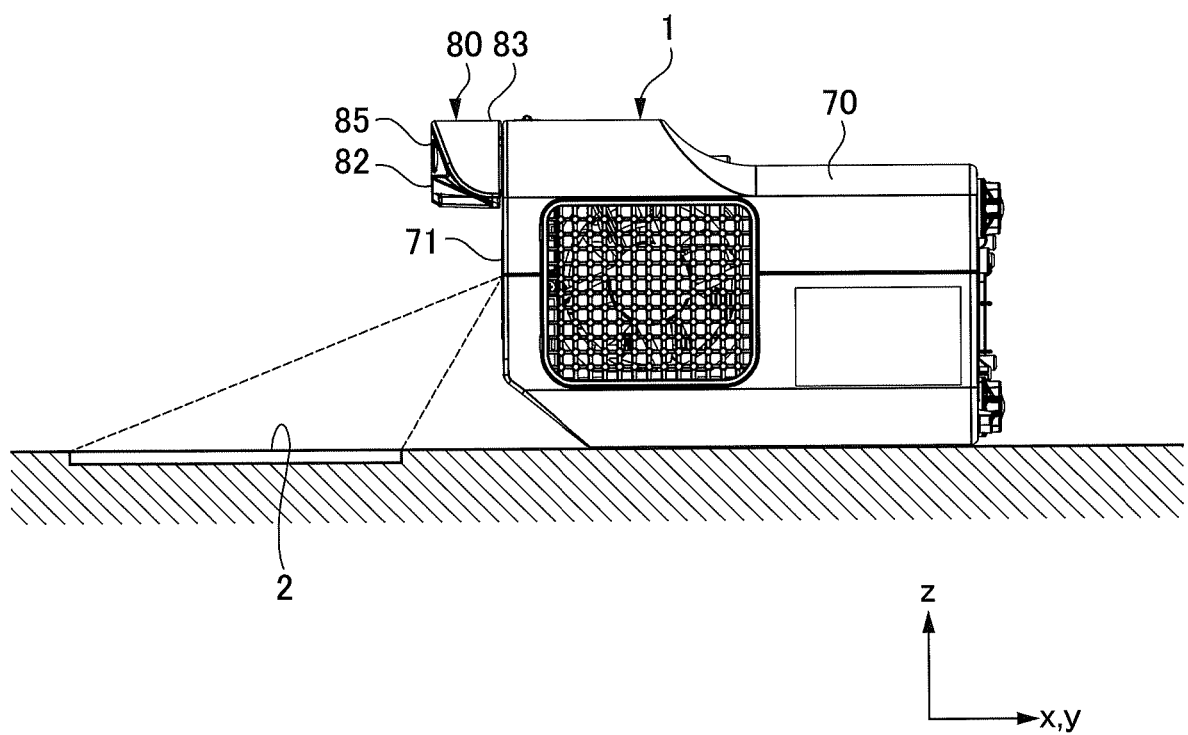
FIG. 32 is a side view of a desktop projection of the projection apparatus according to an embodiment of the present invention.

FIG. 32 is a side view illustrating an embodiment of a desktop projection of the projection apparatus 1. In the case of a desktop projection, as illustrated in FIG. 32, the back surface of the projection apparatus 1 contacts a mounting surface. That is, unlike the case of the floor-standing projection illustrated in FIG. 12 and the like, in this case, the main body unit 70 is tilted 90 degrees. Thus, the upper surface 71 faces the horizontal direction rather than facing upward, as does the interactive module 80 with the upper surface 82 thereof facing the horizontal direction, and the pen holder 85 also opens in the horizontal direction. In this case, the front surface 83 is positioned to face upward.

Figure 33:
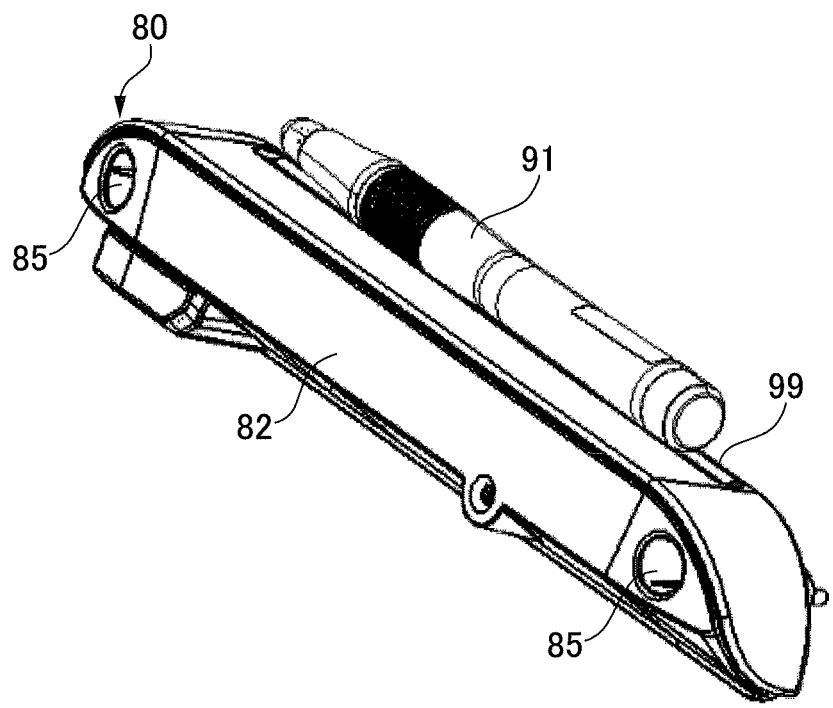
FIG. 33 is a perspective view of the holding state of an interactive pen during the desk projection according to an embodiment of the present invention.

FIG. 33 is a perspective view illustrating the state of holding the interactive pen 91 at the time of desk projection. The front surface 83 of the interactive module 80 is provided with a recess portion 99 along the longitudinal direction (the y direction) of the module. The shape of the recess portion 99 is formed to have the same curvature as the outer circumferential surface of the interactive pen 91. Thus, when the projection apparatus 1 is used in the form of a desktop projection as illustrated in FIG. 32, the interactive pen 91 is mounted in the recess portion 99 as illustrated in FIG. 33. Accordingly, the interactive pen 91 is fit into the recess portion 99 and is held on the interactive module 80.

<Suspended Projection Apparatus>

Figure 34:
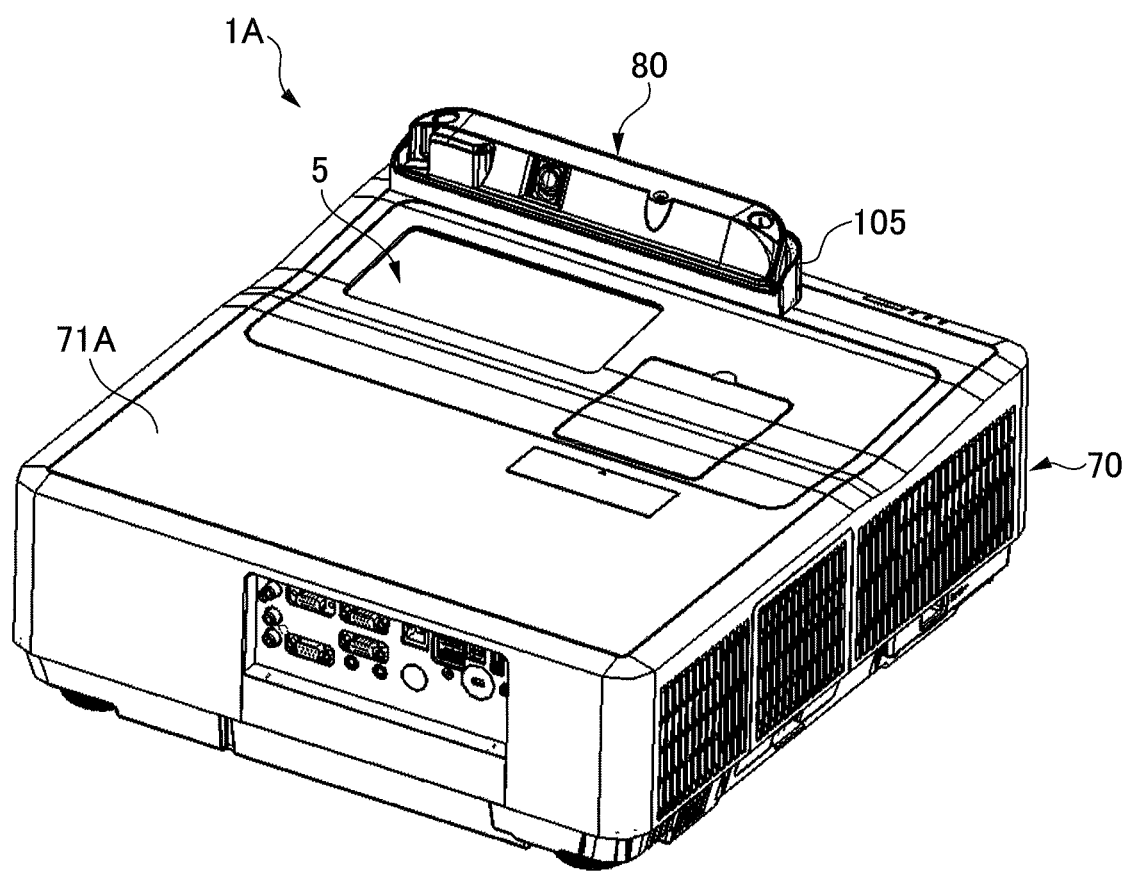
FIG. 34 is a perspective view of a suspended projection apparatus according to an embodiment of the present invention.

FIG. 34 is a perspective view of a suspended projection apparatus 1A. The projection apparatus according to the embodiment may have a shape other than a vertical shape illustrated in FIG. 11 and the like, and may have a horizontal shape with the height dimension shorter than the width dimension or the depth dimension, as in the projection apparatus 1A illustrated in FIG. 34. The throw ratio of the projection apparatus 1A illustrated in FIG. 34 is approximately 0.27 to 0.29. In the projection apparatus 1A also, the interactive module 80 is mounted on a mounting surface 71A (corresponding to the upper surface 71) of the main body unit 70 on which the projection port 5 is provided. As illustrated in FIGS. 17 and 18, the interactive module 80 may be electrically coupled to the main body unit 70 or may be coupled to the main body unit 70 via an attachment 105 as illustrated in FIG. 34. For example, the bottom surface of the attachment 105 is bonded and fixed to the mounting surface 71A of the main body unit 70, and the interactive module 80 is locked to the attachment 105 without being electrically coupled to the main body unit 70.

Figure 35:
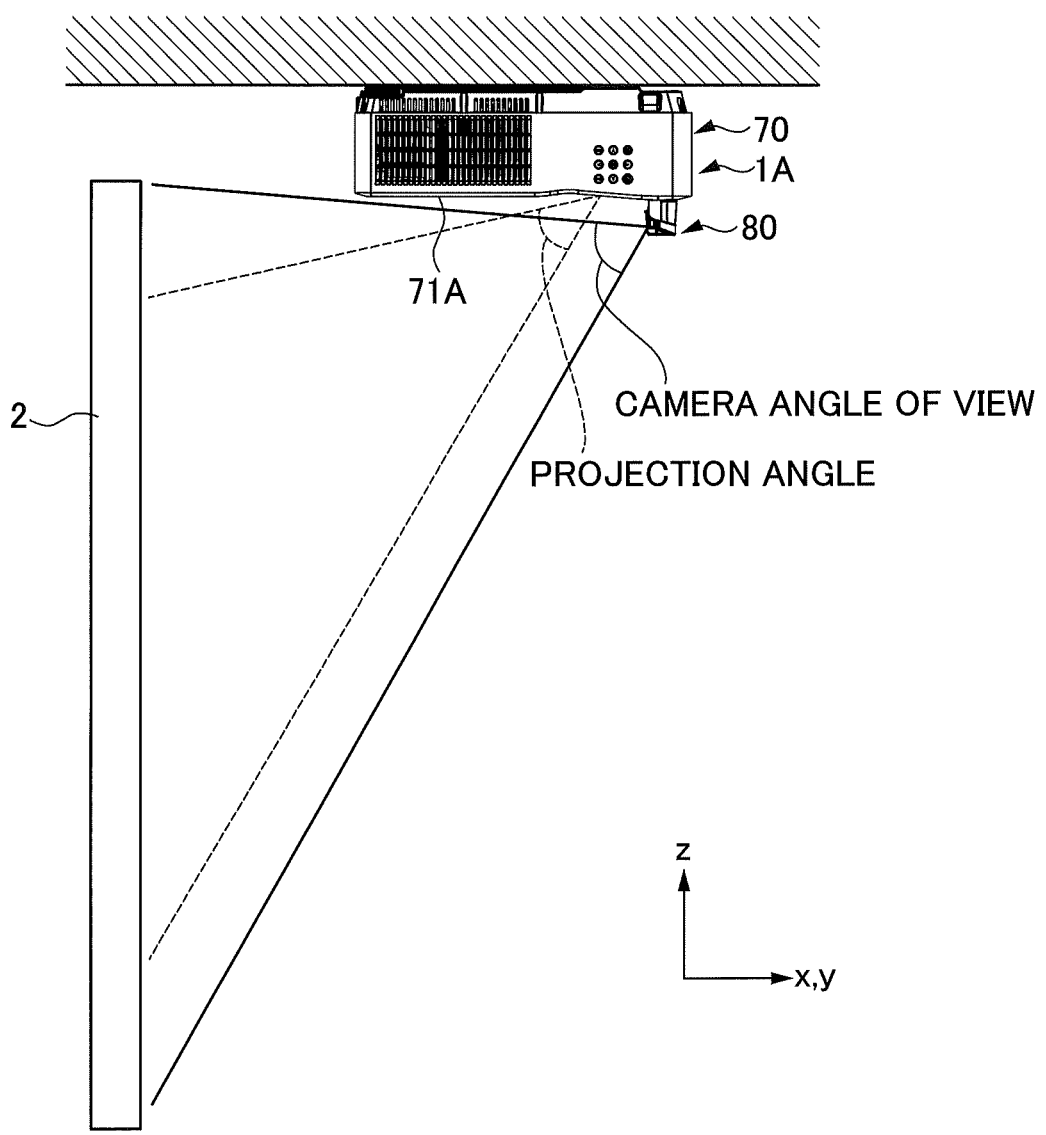
FIG. 35 is a side view illustrating the use of a suspended projection apparatus according to an embodiment of the present invention.

FIG. 35 is a side view illustrating an embodiment of the use of the suspended projection apparatus 1A. As illustrated in FIG. 35, in the suspended projection apparatus 1A, the main body unit 70 is fixed to the ceiling and the like, and the mounting surface 71A is positioned so as to face downward. For this reason, the interactive module 80 provided on the mounting surface 71A is disposed so as to protrude downwardly. Even in this case, as illustrated in FIG. 35, by disposing the interactive module 80 on the side opposite to the side facing the screen 2 with the projection port 5 located between the interactive module 80 and the screen 2, the imaging direction is defined so that the entire projection image output from the main body unit 70 is within the range of the camera angle of view of the interactive module 80, in a side view.

As described above, the present embodiment has been described with reference to specific examples; however, the present disclosure is not limited to these specific examples. Specific examples, to which design modifications have been made as appropriate by those skilled in the art, are also encompassed by the present disclosure as long as the examples have the features of the present disclosure. The elements and the arrangement, conditions, shape, and the like thereof, provided in each of the specific examples described above, may be modified as appropriate without being limited to those exemplified. Each element included in each of the above-described specific examples may vary in combination as appropriate, unless there is a technical inconsistency.

In the above-described embodiment, an example of a configuration in which the interactive module 80 is equipped with the imaging unit 84, such as an infrared camera, and an image of the projection screen captured by the imaging unit 84 is used for performing interactive operations, has been described. However, as long as the interactive module 80 is configured such that an operation of an operator on the projection screen can be detected based on some kind of input information, the interactive module 80 may be configured such that input information other than the captured screen captured by the imaging unit 84 is used. A configuration that detects the movements of the operator on the projection screen by a means other than a camera, for example, by ultrasound, may also be used.

Although the above embodiment illustrates the projection apparatus 1 of the ultra-short-focus type, the projection apparatus may be of a short-focus type with a longer projection distance than the above-described definition of an ultra-short-focus type, or a conventional projection apparatus requiring a longer projection distance.

According to one embodiment of the present invention, a compact projection apparatus having an interactive function can be implemented.

The projection apparatus and the operation detection apparatus are not limited to the specific embodiments described in the detailed description, and variations and modifications may be made without departing from the spirit and scope of the present invention.

What is claimed is:

1. A projection apparatus comprising:
a main body configured to project and display an image from a projection port of the main body; and
an operation detection apparatus detachably attached to the main body and configured to acquire operation information relating to an operation on a projection screen performed by an operator,
wherein the main body includes an attachment portion provided on a surface of the main body on which the projection port is provided, the attachment portion being a portion where the operation detection apparatus attached to the main body,
wherein on a mounting surface that is the surface of the main body on which the attachment portion is provided, the attachment portion is disposed on a side opposite to a side facing the projection screen, with the projection port located between the attachment portion and the projection screen, and
wherein when the operation detection apparatus is attached to the attachment portion, the operation detection apparatus is disposed so as not to protrude outside from a contour of the mounting surface as viewed from a normal direction of the mounting surface, and the operation detection apparatus is disposed along an outer rim of the mounting surface on the side opposite to the side facing the projection screen.

2. The projection apparatus according to claim 1, wherein the operation detection apparatus includes an imager, and acquires an image of the projection screen captured by the imager as the operation information.

3. The projection apparatus according to claim 2, wherein the operation detection apparatus includes an adjustment mechanism configured to adjust a tilt angle of the imager.

4. The projection apparatus according to claim 3, wherein
a mounting surface, which is the surface on which the attachment portion is provided, is an upper surface of the main body, and
the adjustment mechanism is operable from the upper surface of the main body.

5. The operation detection apparatus according to claim 1.

6. A projection apparatus comprising:
a main body configured to project and display an image from a projection port of the main body; and
an operation detection apparatus detachably attached to the main body and configured to acquire operation information relating to an operation on a projection screen performed by an operator,
wherein the main body includes an attachment portion provided on a surface of the main body on which the projection port is provided, the attachment portion being a portion where the operation detection apparatus attached to the main body, and
wherein the main body incudes
an operation part configured to receive input of an operation instruction for performing a projection operation, the operation part being provided on a mounting surface that is the surface of the main body on which the attachment portion is provided, the operation part is disposed so as to be operated from a side opposite to a projection direction from the projection port, and a surface of the operation detection apparatus facing the projection direction is a tilted surface having an upper portion tilted toward the side opposite to the projection direction.

7. A projection apparatus comprising:

a main body configured to project and display an image from a projection port of the main body; and an operation detection apparatus detachably attached to the main body and configured to acquire operation information relating to an operation on a projection screen performed by an operator, wherein the main body includes an attachment portion provided on a surface of the main body on which the projection port is provided, the attachment portion being a portion where the operation detection apparatus attached to the main body, the operation detection apparatus is electrically coupled to the main body when the operation detection apparatus is attached to the attachment portion, the main body includes a detector configured to detect that the operation detection apparatus has been attached to the attachment portion, and the operation detection apparatus is electrically coupled to the main body upon detecting that the operation detection apparatus has been attached by the detector.

8. The projection apparatus according to claim 7, wherein a power source of the main body becomes operable upon detecting that the operation detection apparatus has been attached by the detector.

* * * * *